United States Patent
Sprague et al.

(10) Patent No.: US 7,724,210 B2
(45) Date of Patent: *May 25, 2010

(54) SCANNED LIGHT DISPLAY SYSTEM USING LARGE NUMERICAL APERTURE LIGHT SOURCE, METHOD OF USING SAME, AND METHOD OF MAKING SCANNING MIRROR ASSEMBLIES

(75) Inventors: Randall B. Sprague, Carnation, WA (US); Hakan Urey, Istanbul (TR); Dean R. Brown, Lynnwood, WA (US); Margaret K. Brown, Seattle, WA (US); John R. Lewis, Bellevue, WA (US); Mathew D. Watson, Bellevue, WA (US); Thomas W. Montague, Mercer Island, WA (US); Stephen R. Willey, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 1330 days.

This patent is subject to a terminal disclaimer.

(21) Appl. No.: 11/078,970

(22) Filed: Mar. 9, 2005

(65) Prior Publication Data
US 2005/0264502 A1 Dec. 1, 2005

Related U.S. Application Data

(60) Provisional application No. 60/569,389, filed on May 7, 2004, provisional application No. 60/611,183, filed on Sep. 17, 2004, provisional application No. 60/610,911, filed on Sep. 17, 2004.

(51) Int. Cl.
*G09G 5/00* (2006.01)

(52) U.S. Cl. .......................................... 345/8; 345/32
(58) Field of Classification Search ................ 345/7–9, 345/32; 359/354, 212–214, 223–224, 630–633, 359/201–202, 643
See application file for complete search history.

(56) References Cited

U.S. PATENT DOCUMENTS

| | | | |
|---|---|---|---|
| 4,902,083 A | 2/1990 | Wells | 350/6.6 |
| 4,934,773 A | 6/1990 | Becker | 350/6.6 |
| 5,003,300 A | 3/1991 | Wells | 340/705 |
| 5,023,905 A | 6/1991 | Wells et al. | 379/96 |
| 5,048,077 A | 9/1991 | Wells et al. | 379/96 |
| 5,325,386 A | 6/1994 | Jewell et al. | 359/214 |
| 5,334,991 A | 8/1994 | Wells et al. | 345/8 |
| 5,467,104 A | 11/1995 | Furness, III et al. | 345/8 |

(Continued)

*Primary Examiner*—Ricardo L Osorio
(74) *Attorney, Agent, or Firm*—Kevin D. Willis

(57) ABSTRACT

A scanned light display system includes a light source operable to emit light and a curved mirror positioned to receive at least a portion of the light. The curved mirror is configured to substantially collimate the received light. The substantially collimated light is scanned to form an image by moving at least one of the light source and the curved mirror relative to each other. Alternatively, the scanned light display system includes a light source operable to emit light, a curved mirror positioned to receive some of the light, and an optical element positioned to receive light reflected from the curved mirror. The optical element is configured to substantially collimate the reflected light. The substantially collimated light is scanned to form an image by moving at least one of the light source, the curved mirror, and the optical element. Scanning mirror assemblies and methods of making are also disclosed.

51 Claims, 14 Drawing Sheets

U.S. PATENT DOCUMENTS

| | | | |
|---|---|---|---|
| 5,557,444 A | 9/1996 | Melville et al. | 359/199 |
| 5,657,165 A | 8/1997 | Karpman et al. | 359/634 |
| 5,742,421 A | 4/1998 | Wells et al. | 359/214 |
| 6,151,167 A | 11/2000 | Melville | 359/618 |
| 6,160,527 A | 12/2000 | Morishima et al. | 345/32 |
| 6,173,895 B1 | 1/2001 | Plesko | 235/462.33 |
| 6,204,832 B1 | 3/2001 | Melville et al. | 345/55 |
| 6,331,909 B1 | 12/2001 | Dunfield | |
| 6,384,406 B1 | 5/2002 | Wine et al. | 250/234 |
| 6,433,907 B1 | 8/2002 | Lippert | |
| 6,755,536 B2 | 6/2004 | Tegreene et al. | 353/94 |
| 6,879,442 B2 | 4/2005 | Pezeshki | |
| 2002/0030636 A1 | 3/2002 | Richards | 359/630 |
| 2003/0086172 A1 | 5/2003 | Urey | 359/566 |
| 2006/0061846 A1 | 3/2006 | Sprague et al. | 359/204 |
| 2006/0181484 A1 | 8/2006 | Sprague et al. | 345/32 |
| 2006/0187512 A1 | 8/2006 | Sprague et al. | 359/204 |

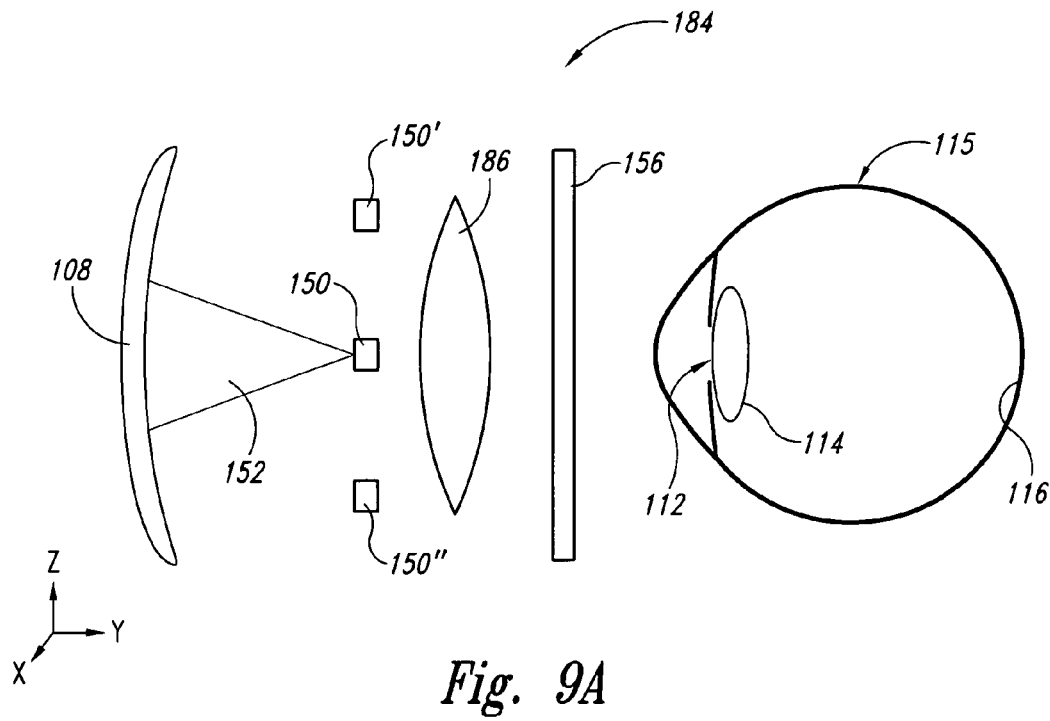
*Fig. 9A*
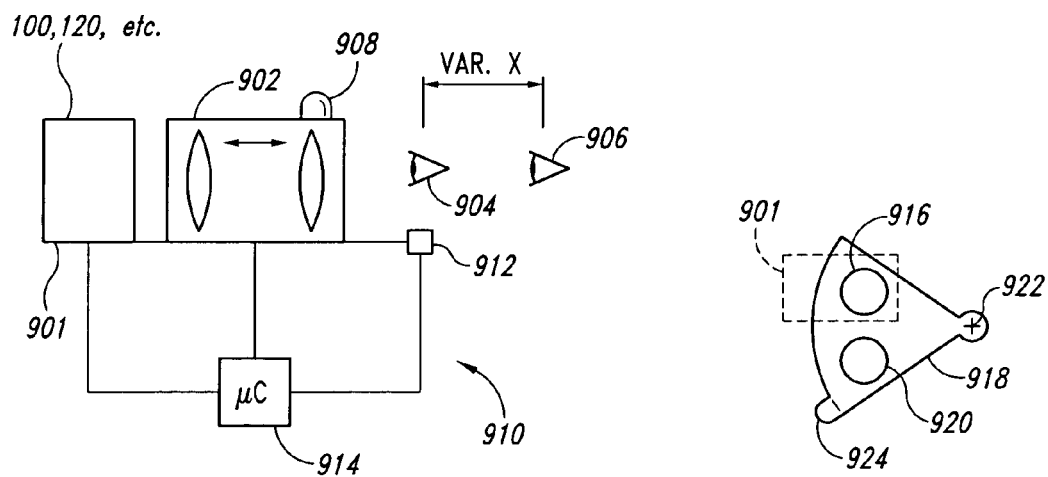
*Fig. 9B*
*Fig. 9C*

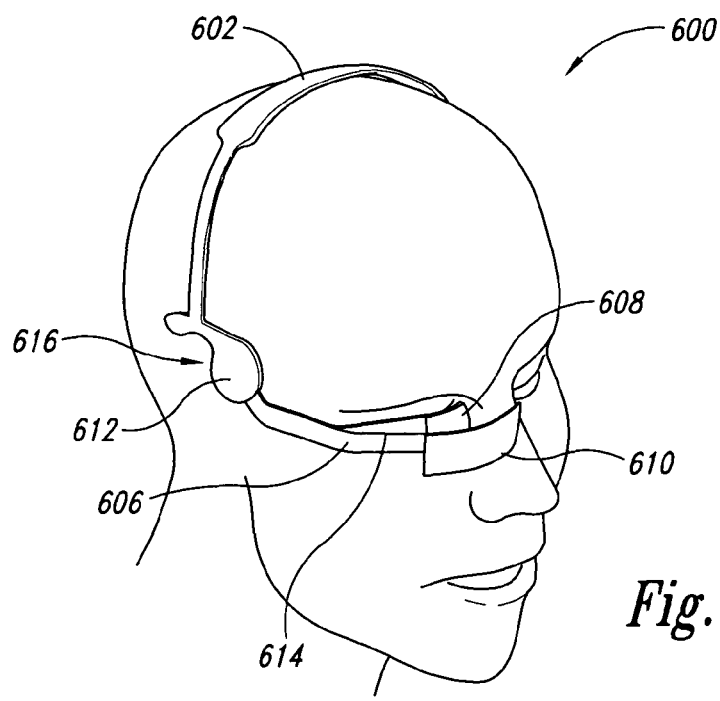
Fig. 18
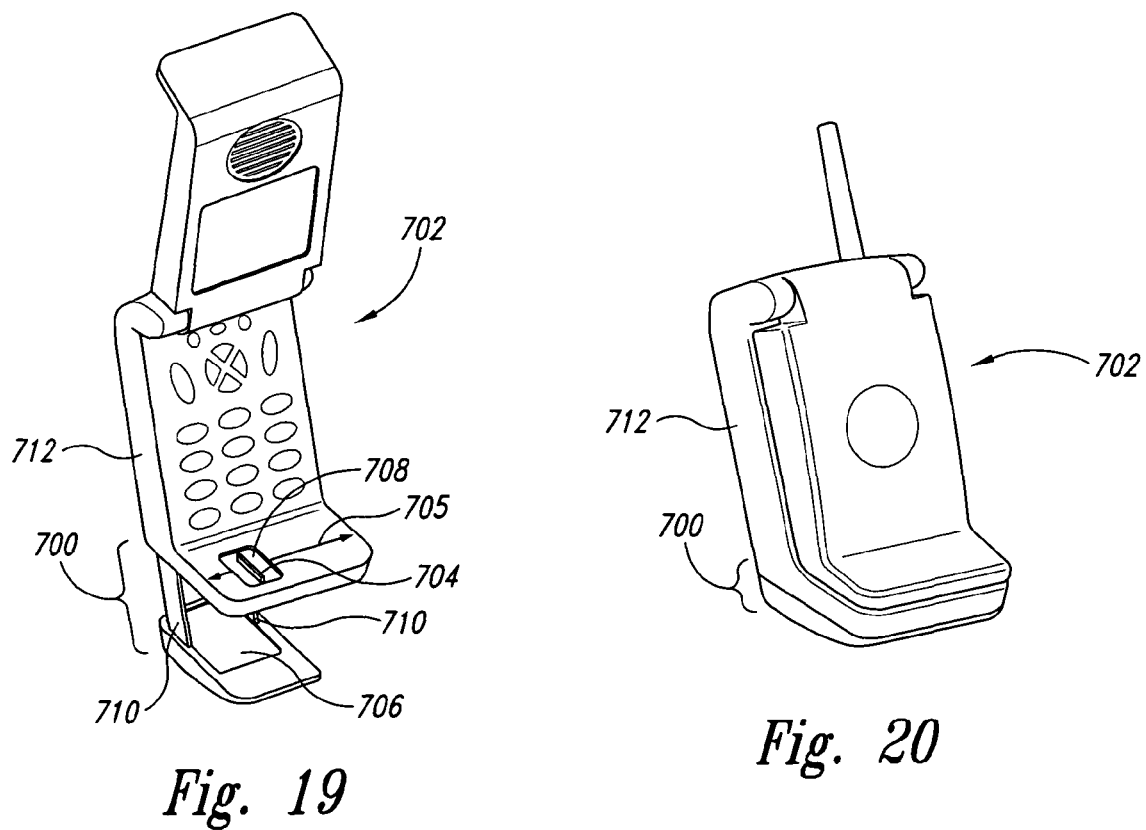
Fig. 19
Fig. 20

SCANNED LIGHT DISPLAY SYSTEM USING LARGE NUMERICAL APERTURE LIGHT SOURCE, METHOD OF USING SAME, AND METHOD OF MAKING SCANNING MIRROR ASSEMBLIES

CROSS-REFERENCE TO RELATED APPLICATIONS

This application claims the benefit of Provisional Application No. 60/569,389, filed on May 7, 2004; Provisional Application No. 60/611,183, filed on Sep. 17, 2004; and Provisional Application No. 60/610,911, filed Sep. 17, 2004, the disclosures of each are incorporated herein by reference.

TECHNICAL FIELD

This invention relates to scanned light display systems, and more particularly to scanned light displays using large numerical aperture light sources and/or relatively compact optical systems for manipulating light from the light sources.

BACKGROUND

A variety of techniques are available for providing visual displays of graphical or video images to a user. In many applications cathode ray tube type displays (CRTs), such as televisions and computer monitors, produce images for viewing. Such devices suffer from several limitations. For example, typical CRTs are bulky and consume substantial amounts of power, making them undesirable for portable or head-mounted applications.

Matrix addressable displays, such as liquid crystal displays and field emission displays, may be less bulky and consume less power. However, typical matrix addressable displays utilize screens that are several inches across. Such screens have limited use in head mounted applications or in applications where the display is intended to occupy only a small portion of a user's field-of-view. Such displays have been reduced in size at the cost of increasingly difficult processing and limited resolution or brightness. Also, improving resolution of such displays typically requires a significant increase in complexity.

Another form of display is a scanned beam display. Various scanned beam displays have been disclosed in the art, such as that described in U.S. Pat. No. 5,467,104 of Furness et al., entitled VIRTUAL RETINAL DISPLAY, which is incorporated herein by reference. In one example of a scanned beam display, a scanning source outputs a beam of coherent light that is reflected by a mirror in a MEMS scanner onto a viewer's retina. The scanned light enters the viewer's eye through the viewer's pupil and is directed onto the retina by the cornea and lens. The intensity of the light from the light source is modulated as the beam is scanned horizontally and vertically so that the viewer perceives an image. In other examples, the scanning source may include one or more modulated light emitters that are rotated through an angular sweep to scan the light onto the viewer's retina. One example of such a scanner suitable for either type of display is described in U.S. Pat. No. 5,557,444 to Melville et al., entitled MINIATURE OPTICAL SCANNER FOR A TWO-AXIS SCANNING SYSTEM, which is incorporated herein by reference.

Scanned beam displays are sometimes used for partial or augmented view applications in which a portion of the display is positioned in the user's field-of-view to create an image that occupies a region of the user's field-of-view. The user can thus see both a displayed virtual image and a background image. If the background light is occluded, the viewer perceives only the virtual image. Applications for see-through and occluded scanned beam displays include head-mounted displays and camera electronic viewfinders, for example.

A common requirement of scanned beam displays has been the need to collimate the light into a beam having a relatively low numerical aperture, i.e., a small divergence angle, prior to scanning the beam across the field-of-view. Unfortunately, providing a collimated, low numerical aperture beam of light frequently employs relatively expensive coherent light sources such as lasers, or edge-emitting light emitting diodes ("EELED"). Such collimated light sources may result in low optical efficiency and have the effect of producing a dimly lit display.

Scanned beam displays frequently require a complex set of optics to generate a scanned beam image. In one example, light from a low numerical aperture light source is collected by a set of optics to form a beam. This light beam is then directed to a bi-axial scanner, which scans the light beam into a set of optics that images the light beam onto an exit pupil expander ("EPE") placed at an intermediate image plane. The expanded image is then conveyed by another set of optics that translates positional information from the EPE into angular information at the viewer's pupil. In such displays, the scanner outputs angular information that is converted to positional information at the EPE, only to have this positional information converted back to angular information through the viewing optics. The large number of optical components used by these types of complex imaging systems results in displays that are relatively bulky and expensive.

SUMMARY

According to an aspect, a scanned light display system includes a light source operable to emit light and a curved mirror positioned to receive at least a portion of the light. The curved mirror is configured to substantially collimate the light received from the light source. An actuator is operably coupled to at least one of the light source and the curved mirror to move the light source and the curved mirror relative to each other in order to scan the substantially collimated light to form an image.

According to another aspect, a scanned light display system includes a light source operable to emit light, a curved mirror positioned to receive at least a portion of the light, and an optical element positioned in front of the curved mirror to receive and relay the scanned light image. The optical element (e.g., a lens) is positioned to receive light reflected from the curved mirror and configured to substantially collimate the light received from the curved mirror. An actuator is operably coupled to at least one of the light source, the relay optical element (e.g., a lens), and the curved mirror to move at least one of the light source, the relay optical element, and the curved mirror in order to scan the substantially collimated light to form an image. Optionally, the relay optical element (e.g., a lens) may be made with variable power to allow for a range of eye reliefs. This may be used to adapt the display to the use environment and offer a range of field-of-view versus viewing distance pairs.

According to another aspect, a scanned light display system may be adapted to view stored or live still or video images as, for example, a camera subsystem. According to still another aspect, a scanned light display system may be adapted to view streaming and/or wireless media including video or still images.

BRIEF DESCRIPTION OF THE DRAWINGS

FIG. 9A is a schematic cross-sectional view of a scanned beam display in which the display includes a lens disposed between the viewer's eye and the array of light emitters according to an embodiment.

FIG. 9B is a schematic cross-sectional view of a variable power objective optical element disposed between the viewer's eye and the array of light emitters that allows for a range of viewing distances according to an embodiment.

FIG. 9C is an elevation from the viewer's perspective of a simple mechanism for selecting from among a plurality of objective optical elements according to an embodiment.

FIG. 18 is a schematic isometric view of a scanned beam display having a support structure configured to be worn on a viewer's head according to an embodiment.

FIG. 19 is a schematic isometric view of a scanned beam display incorporated into a cellular phone according to an embodiment.

FIG. 20 is a schematic isometric view of the cellular phone of FIG. 19 with the scanned beam display and the phone display closed.

DETAILED DESCRIPTION OF THE EMBODIMENTS

Figure 1:
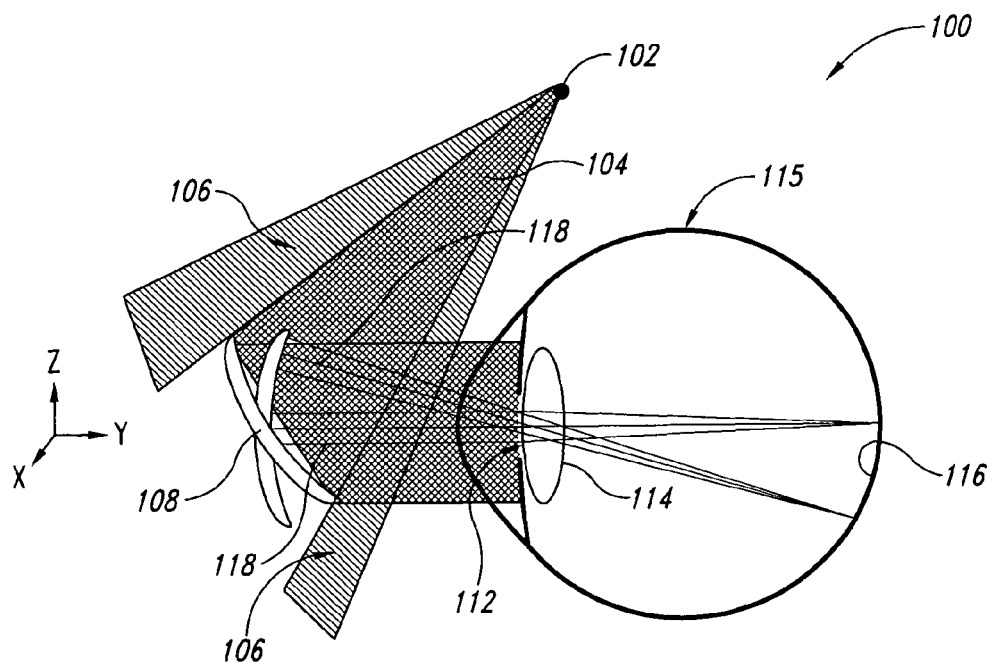
FIG. 1 is a schematic cross-sectional view of a scanned beam display employing an off-axis light source according to an embodiment.

FIG. 1 shows a scanned beam display 100 according to an embodiment. The display 100 includes an off-axis light source 102 for producing light 104 having a large numerical aperture. In some contexts, the light source 100 may also be referred to as a Lambertian light source, though not all large numerical aperture devices are Lambertian. Some of the light 104 from the light source 102 is reflected by a relatively large curved mirror 108 (e.g., a spherical mirror). The curved mirror 108 may be scanned both horizontally and vertically, although only two vertical scan positions are shown in FIG. 1.

The curved mirror 108 provides two functions. First, the curved mirror 108 substantially collimates the light 104 into a beam 118 at and near an image plane defined by a pupil 112 of a viewer's eye 115. The beam 118 is larger than the diameter of the viewer's pupil 112. The viewer's lens 114 then focuses the collimated beam 118 onto the viewer's retina 116. The degree of collimation provided by the curved mirror 108 may correspond to an apparent image distance. Second, a field-of-view is formed on the curved mirror 108 as it sweeps the light 104, while the intensity of the light 104 is modulated to sequentially create an array of picture elements. If the curved mirror 108 is semi-transparent, the display 100 may be configured as a see-through display in which a background image positioned behind the curved mirror 108 is visible. The collimated beam 118 may be scanned across the viewer's pupil 112 in the vertical z-axis direction by tilting, i.e., rotating the curved mirror 108 about the x-axis, as shown in FIG. 1, vertically moving the curved mirror 108 in the z-axis direction without rotating the curved mirror 108, or combinations thereof. Rotating or vertically moving the curved mirror 108 will both effectively scan the collimated beam 118 in the vertical axis across the viewer's pupil 112. Similarly, the collimated beam 118 may be scanned in the horizontal x-axis direction by tilting, i.e., rotating the curved mirror 108 about the z-axis, horizontally moving the curved mirror 108 in the x-axis direction without rotating the curved mirror 18, or combinations thereof.

The curved mirror 108 should be relatively large to allow the collimated beam 118 to sweep across the retina 116 during scanning, while keeping a portion of the beam 108 aligned with the pupil 112. By making the diameter of the curved mirror 108 relatively large, the apparent position of the light source moves across the curved mirror 108 as it scans, creating the impression of an array of picture elements. Furthermore, by making the diameter of the curved mirror 108 relatively large, there is a sufficient portion of the collimated beam 118 to fill the viewer's pupil 112, even at extreme angles.

The light source 102 may be a light source, such as a surface-emitting LED light source, an organic LED (OLED) light source, or another suitable light source. Such sources emit light in a cone or Lambertian pattern that fills the curved mirror 108 substantially uniformly. Uniformly filling the curved mirror 108 improves image uniformity because different portions of the beam 118 projected by the curved mirror 108 enter the pupil 112 from different angles during a horizontal and vertical sweep of the collimated beam 118. Thus, pixels near the top of the displayed image use one portion of the collimated beam 118, pixels near the middle of the image use another portion of the collimated beam 118, and pixels near the bottom use yet another portion of the beam 118. The different portions of the collimated beam 118 that are used to form an image is a continuum with the portion of the beam 118 entering the pupil 112 constantly changing as the collimated beam 118 is scanned back and forth.

Although the efficiency of the light source 102 may be less than optimum because a portion of the light, shown as light 106, misses the curved mirror 108, the numerical aperture of the light source 102 may be substantially matched to the collection numerical aperture of the curved mirror 108 to provide greater efficiency, while meeting other design constraints. For example, one or more laser light sources (not shown) may be used. In general, lasers emit light having a smaller numerical aperture, i.e., a more collimated beam, that may be spread out by beam shaping optics to fill the curved mirror 108. However, the use of a laser light source may not provide the cost advantages of using a high numerical aperture light source.

One advantage of some embodiments is a loosening of alignment tolerances. For some embodiments, the light source 102 X, Y, Roll, Yaw, and Pitch axes need not be precisely controlled. The Z axis, which establishes the display focus, generally has tolerances typical of other scanned light displays. For some embodiments where it is desirable to have an adjustable focus, even the Z axis does not need to be precisely positioned in a fixed manner. This reduction in the amount of precision alignment, along with the elimination of numerous lenses, may help to reduce the system cost.

Table 1 shows the relationship between eye relief, exit pupil, field-of-view (FV), and curved mirror diameter for three embodiments for a typical viewer's pupil diameter of 2 mm. In Cases 1 and 2 of Table 1, it is assumed that the fast scan (FS) axis is the horizontal x-axis. Case 3 assumes the fast scan axis is aligned with the vertical z-axis. Case 3 also assumes that the horizontal maximum scan angle (MSA) angle will be smaller than the vertical MSA angle through the use of zones.

TABLE 1

Mirror Diameter for various display configurations

| Parameter | Case 1 | Case 2 | Case 3 |
|---|---|---|---|
| Eye Relief (mm) | 10 | 12 | 10 |
| Exit Pupil (mm) | 5 | 5 | 5 |
| Diagonal FOV (degrees) | 30 | 30 | 30 |
| FS FOV (degrees) | 24 | 24 | 24 |
| Scanner Angle for FS (degrees) | 6 | 6 | 4.5 |
| Mirror Diameter (mm) | 9.2 | 10 | 8.1 |

The use of zones refers to using more than one light source rather than a single light source, and will be discussed in more detail with reference to the embodiments shown in FIGS. 4 through 24. Each light emitter in the array may provide light for a range, or zone of pixels. By using a zoned approach, the curved mirror 108 need only make enough fast scan sweeps to fill a zone during a given video frame, rather than having to make enough sweeps to fill the entire frame. The slow scan angle is reduced because it only needs to scan the light from a given source enough to fill the gap to the zones of the neighboring light sources (and optionally, any blending zone). Thus, the use of more than one light source may greatly reduce the required mirror fast scan frequency. Furthermore, slowing the mirror fast scan may also increase the dwell time on each pixel and improve the achievable brightness using a given light source.

The display 100, shown in FIG. 1, is able to use a large numerical light source without the complex optical systems typically associated with scanned beam displays using such light sources.

Figure 2:
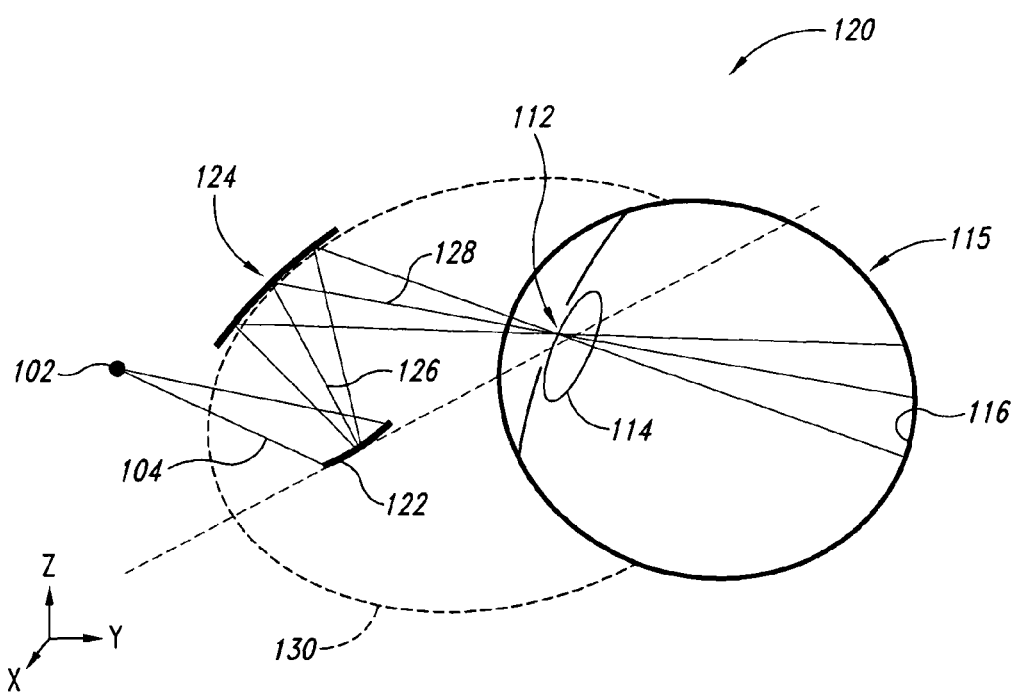
FIG. 2 is a schematic cross-sectional view of a scanned beam display that is more compact than the scanning beam display of FIG. 1 according to an embodiment.

FIG. 2 shows a scanned beam display 120 that also employs an off-axis light source according to an embodiment. The configuration of the display 120 facilitates using a smaller scan mirror size by reflecting the image produced thereby off an intermediate fixed reflective surface 124 (e.g., an elliptical mirror). In operation, the light source 102 emits the light 104 that is substantially collimated and reflected from a scannable curved mirror 122 located at a first focal point of an ellipse 130. Light 126 reflected from the curved mirror 122 is reflected from the intermediate fixed reflective surface 124 onto the viewer's pupil 112, and scanned across the viewer's pupil 112 by scanning the curved mirror 122 in a manner similar to the display 100 of FIG. 1. In the display 120, the viewer's pupil 112 is located at the second focal point of the ellipse 130. This configuration of the display 120 may require relatively precise alignment of the curved mirror 122 and the intermediate fixed reflective surface 124. However, the display 120 provides relatively large eye relief and field-of-view without requiring as large a moving mirror as the display 100 of FIG. 1. Additionally, if the intermediate fixed reflective surface 124 is partially transparent (e.g., half-silvered), the system of FIG. 2 may be configured as a see-through display.

Figure 3:
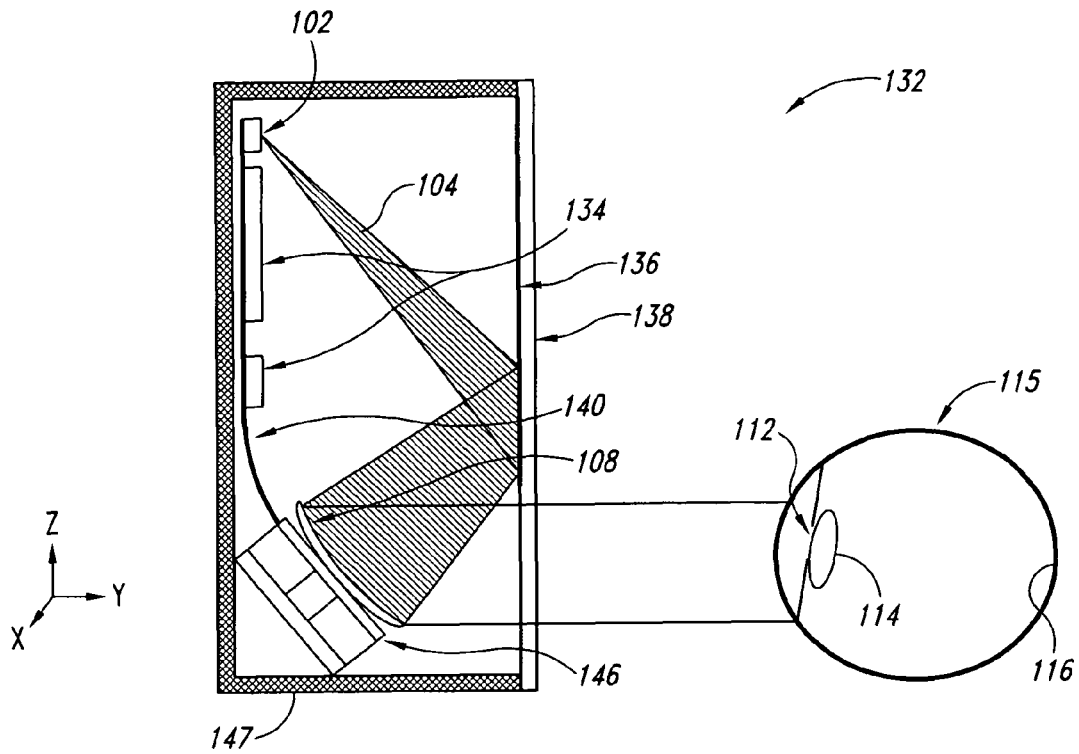
FIG. 3 is a schematic cross-sectional view of a scanned beam display that is more compact than the scanning beam display of FIG. 1 according to an embodiment.

FIG. 3 shows a scanned display 132 according to an embodiment. The display 132 also employs an off-axis light source which enables altering the optical path of the light emitted from the light source. In FIG. 3, the optical path between the light source 102 and scanning curved mirror 108 may be folded by redirecting the light 104 off of a reflective surface 136 onto the curved mirror 108. The display 132 further includes a housing 147 that encloses the light source 102, the curved mirror 108 operable to scan light across the pupil 112 of a viewer under actuation of actuator 146, a reflective surface 136, and a transparent front plate 138 that is connected to the housing 147 and which the viewer views light reflected from the curved mirror 108 therethrough. The actuator 146 may be a magnetic actuator that actuates the curved mirror 108 from instructions received by actuator controller 134 via a flex circuit 140. The components of the display 132 occupy a relatively small volume, making the display 132 well adapted to size-constrained applications such as camera viewfinders, eyewear, and others.

In operation, the light 104 is emitted from the light source 102 and subsequently reflected off of the opposing reflective surface 136. Light reflected from the reflective surface 136 is directed onto the curved mirror 108. The actuator 146 is operable to scan light reflected from the curved mirror 108 across the viewer's pupil 112 in the vertical z-axis direction, the horizontal x-axis direction, or both by scanning the curved mirror 108 under actuation by the actuator 146 in a manner similar to the display 100.

Figure 4:
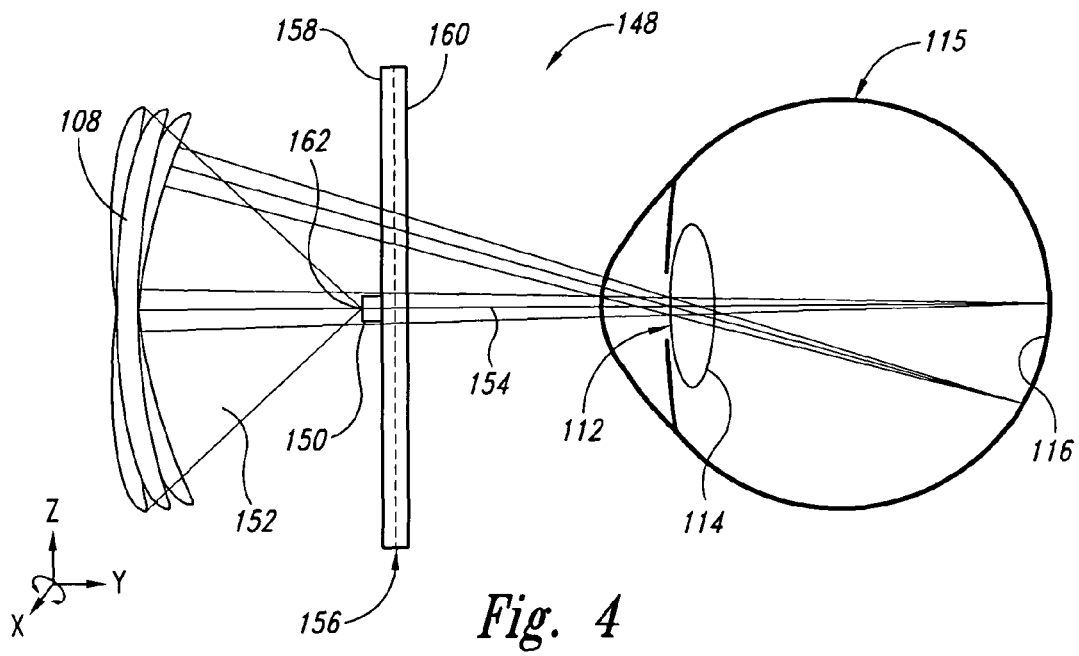
FIG. 4 is a schematic cross-sectional view of a scanned beam display that is more compact than the scanned beam display of FIG. 1 according to an embodiment.

FIG. 4 shows a scanned beam display 148 according to an embodiment. The display 148 includes a curved mirror 108 (e.g., a spherical mirror) aligned directly with a pupil 112 of a viewer. A linear array 150 of light emitters 162 extending generally in the x-axis direction is positioned in front of the viewer's pupil 112 at a focal point of the curved mirror 108. The array 150 of light emitters 162 may be a fully populated array with each light emitter 162 corresponding to a pixel of a horizontal pixel line to be generated on the viewer's retina 116. Light 152 emitted by the light emitters 162 may radiate outwardly over a substantially hemispherical solid angle to strike the curved mirror 108. Light missing the curved mirror 108 may be absorbed by a display housing (not shown). Light hitting the curved mirror 108 is substantially collimated by the curved mirror 108 into a beam 154 and directed back to the pupil 112 where it is focused by the lens 114 of the viewer's eye 115 onto the viewer's retina 116.

Each of the large number of light emitters 162 used in the linear array 150 may be a triad of red/green/blue ("RGB") emitters so that the array 150 provides one RGB triad per horizontal pixel. In one embodiment, the light emitters 162 of the array 150 may be OLED devices. Also, while the array 150 has been referred to as being linear, individual light emitters 162 may, in fact, be offset to allow for manufacturability or other issues. If the light emitters 162 are offset by a substantial portion of a pixel pitch or greater, pixel timing may be modified to account for the positional variation of the light emitters 162 relative to the scan angle of the curved mirror 108. Finally, although the array 150 has been referred to as linear, it may be curved to correspond to the curvature of the curved mirror 108 so that the distance between the curved mirror 108 and each of the light emitters 162 is constant and the light emitters 162 remain in a focal sphere of the curved mirror 108.

Although the light 152 reflected by the curved mirror 108 is directed to the viewer's pupil 112, it will generally also be directed onto the viewer's face. Light from external light sources may also strike the viewer's face, particularly if the display 148 is used as a see-through display in which light sources are positioned behind the curved mirror 108. This extraneous light striking the viewer's face might be reflected from the curved mirror 108 and be visible to the user. To prevent extraneous light on the viewer's face from being visible, an optical filter 156 may be positioned between the array 150 of light emitters 162 and the viewer's pupil 112. One embodiment for the optical filter 156 uses a linear polarizing plate 158 followed by a quarter wave polarizing plate 160. Light reflected from the viewer's face travels through the quarter wave polarizing plate 160 twice (once from the face to the curved mirror 108 and again from the curved mirror 108 to the pupil 112) and is substantially rejected by the filter 156. As a result, the optical filter 156 improves the contrast ratio of the viewed image. One commercially available product that may be employed in filter 156 is sold by the 3M® Company. Other filter designs may also be used.

Since the array 150 is not located at the viewer's focus plane (infinity in the case where the beam 154 is fully collimated), the array 150 and electrical conductors (coupled to the light emitters 162) are not clearly visible to the user. The light emitter array 150 does cut off some of the light returning from the curved mirror 108, however, because the array 150 is small relative to the user's pupil 112, the shadowing effect is minimal.

In operation, the curved mirror 108 scans only in the vertical axis to sweep the collimated beam 154 vertically across the viewer's pupil 112. As with the scanned beam display 100 shown in FIG. 1, the collimated beam 154 may be scanned across the viewer's pupil 112 in the vertical z-axis direction by tilting, i.e., rotating the curved mirror 108 about the x-axis, as shown in FIG. 4, vertically moving the curved mirror 108 in the z-axis direction without rotating the curved mirror 108, or combinations thereof. At each position of the curved mirror 108, the light emitters 162 may emit light substantially simultaneously or may be sequentially activated with an intensity corresponding to the intensity of a correspondingly positioned location in the image being displayed. If the light emitters 162 are formed by RGB triads, the relative intensity of the RGB emitters are controlled to replicate the color of a correspondingly positioned location in the image being displayed. In an alternative embodiment, the curved mirror 108 may be scanned vertically throughout its entire range as each light emitter 162 is illuminated. However, this alternative embodiment is generally less desirable because it requires that the curved mirror 108 be physically scanned at a higher rate than the electrically scanning of the light emitters 162 even though physical scanning is generally slower than electrical scanning. According to one embodiment, the curved mirror 108 is scanned at a frame rate of, 60 Hz for example, and each light emitter 162 in the array 150 is modulated at a frequency of 36 KHz (60 Hz*600 lines) to provide a display having the quality of an SVGA display. In this embodiment, the array 150 may include 800 respective red, green, and blue light emitters 162 (2400 total light emitters 162).

In alternative embodiments, the scanning frequency of the curved mirror 108 may be increased, for example to 600 Hz, and the number of light emitters 162 in the array 48 might be reduced. For the case of a 60 Hz scan, the 2400 light emitters 162 may be multiplexed in groups of 10, thus using only 240 circuits (not shown) driving the light emitters 162. Other combinations may also be used.

Figure 5:
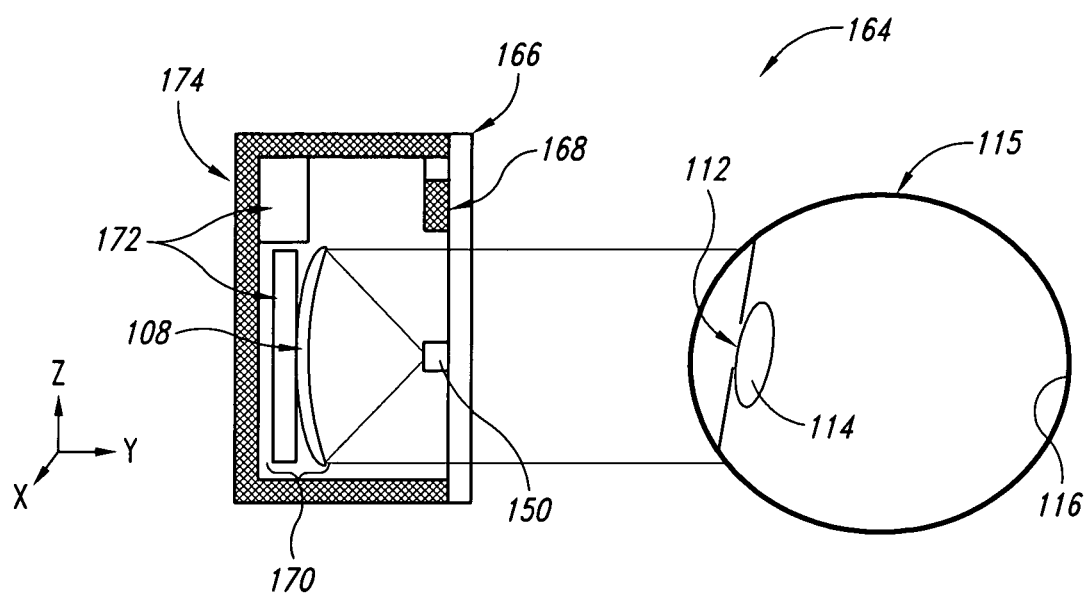
FIG. 5 is a schematic cross-sectional view of the display of FIG. 4 in a package according to an embodiment.

FIG. 5 shows an embodiment for packaging the display 148 of FIG. 4. Display 164 includes a housing 174 for housing a scanning mirror assembly 170 and the array 150. The scanning mirror assembly 170 includes the curved mirror 108 and an actuator 172 operably coupled to an actuator controller 168 for controlling the actuator 172. The actuator 172 is operable to scan the curved mirror 108 as described above with respect to the display 148 of FIG. 4. The display 164 further includes a filter plate 166 connected to the housing 174 for filtering extraneous light in a manner similar to the filter 156 of FIG. 4.

Figure 6:
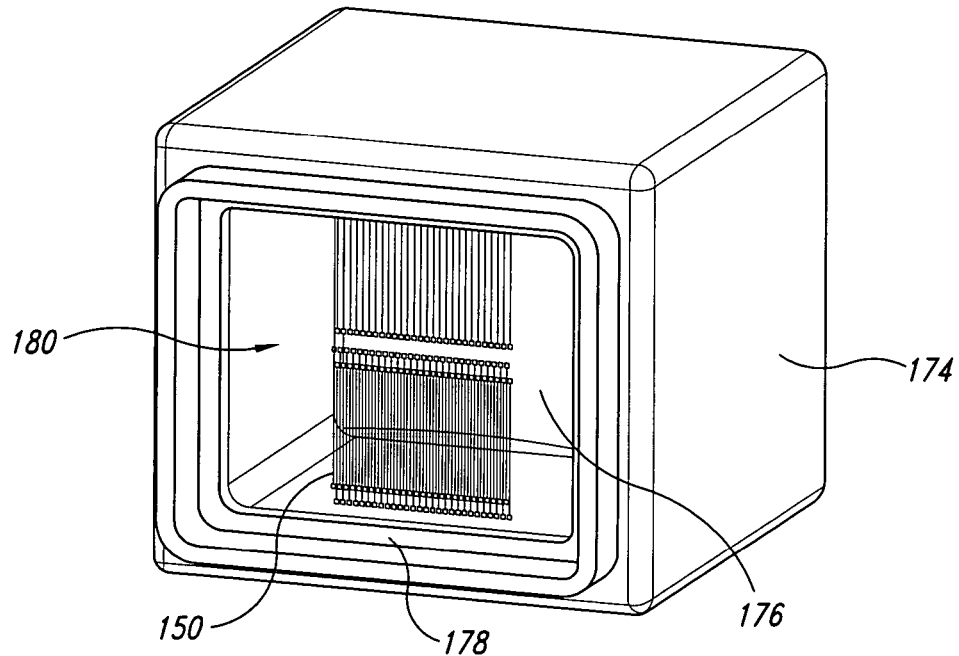
FIG. 6 is a schematic isometric view of the display of FIG. 5.
Figure 7:
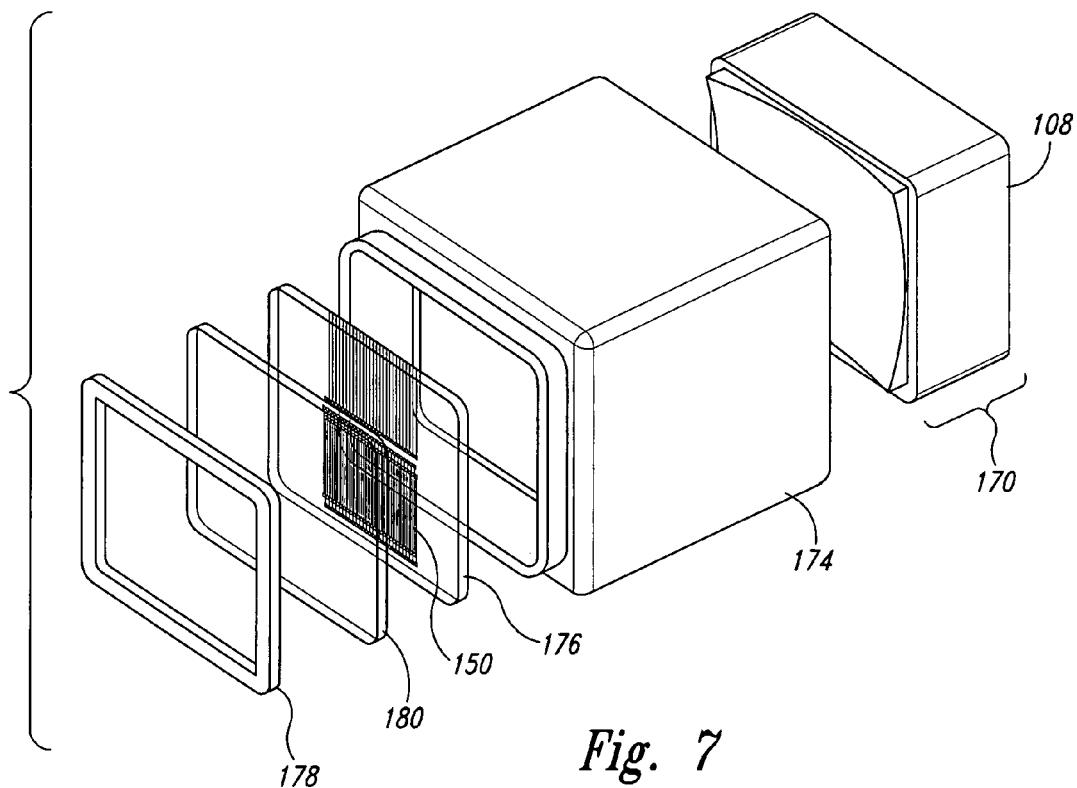
FIG. 7 is an exploded schematic isometric view of the display of FIG. 5 illustrating various components thereof.

FIGS. 6 and 7 show schematic views of the display 164 of FIG. 5. Referring to the exploded view of FIG. 7, the housing 174 includes provision for accepting the scanning mirror assembly 170. In the embodiment of display 164, a glass emitter plate 176 that carries the array 150 is received by the housing 174 and connected to the interior thereof. The emitter array 150 may be masked to prevent the leakage of light in the direction opposite that of the curved mirror 108. The filter plate 180 is placed over the emitter plate 176, and the emitter plate 176 and filter plate 180 are secured within the housing 174 by a frame 178 which defines a viewing aperture.

The filter plate 180 is a combination quarter-wave/polarizer plate assembled with the polarizing side facing the viewer and the quarter wave side facing the emitter plate and scanning mirror, and operates as described above with respect to filter 156. The filter plate 180 may be dispensed with, especially in applications where glare from the viewer's eye, face, or surroundings is not an issue. Also, the quarter-wave rotation and polarization functions may be split into two or more separate plates, may be embodied as thin films, etc. In an alternative embodiment, the glass emitter plate 176 may be eliminated and the array 150 formed directly on the filter plate 180. In another embodiment, the quarter-wave plate is positioned on the opposite end of the housing 174, near the curved mirror 108, or in another alternative position. As an alternative to polarization and rotation, a neutral density, colored, or other filter may be substituted to attenuate light from entering the display through the viewing aperture.

Figure 8:
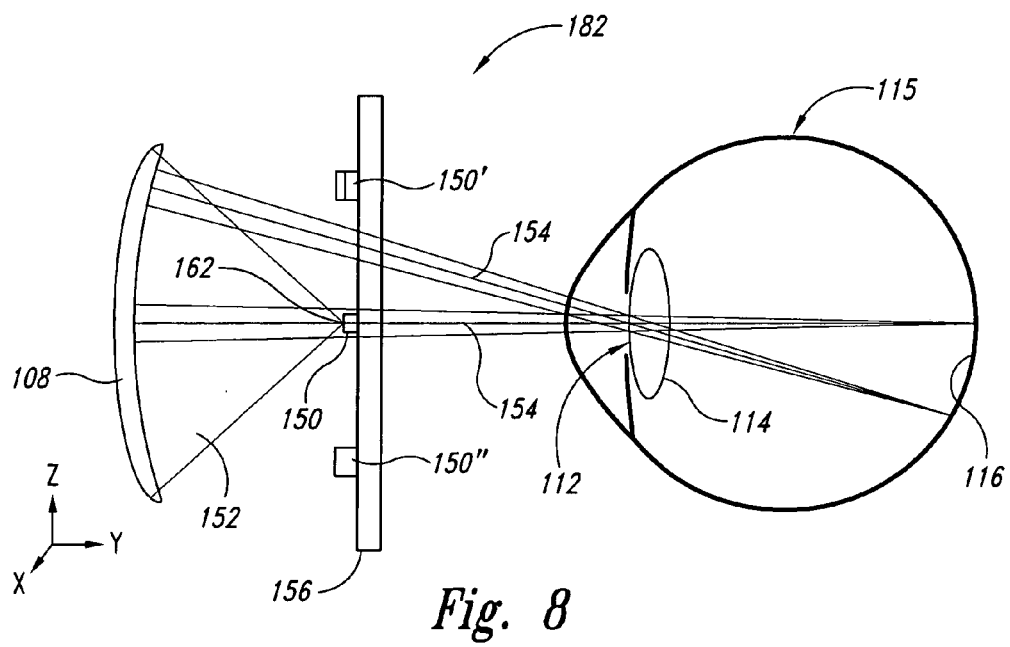
FIG. 8 is a schematic cross-sectional view of a scanned beam display in which the display moves the array of light emitters while the curved mirror remains stationary according to an embodiment.

FIG. 8 shows a scanned beam display 182 that is structurally very similar to the scanned beam display 148 of FIG. 4 according to an embodiment. Therefore, in the interest of brevity, components in both displays 148, 182 that are identical to each other have been provided with the same reference numerals, and an explanation of their structure and function will not be repeated unless the components function differently in the two displays 148, 182. Like the display 148, the display 182 includes a curved mirror 108 aligned with a pupil 112 of a viewer. A linear array 150 of light emitters 162 is also positioned directly in front of the viewer's pupil 112 at a focal point of the curved mirror 108. Each of the light emitters 162 emit light that may have a large numerical aperture. The light emitters 162 preferably emit light from a relatively small cross-section area to provide a high resolution image. The array 150 may be curved to correspond to the curvature of the curved mirror 108 so that the distance between the curved mirror 108 and each of the light emitters 162 is constant and the light emitters 162 remain on a focal sphere of the curved mirror 108. Light 152 emitted by the light emitters 162 is aimed at the curved mirror 108. Light hitting the curved mirror 108 is reflected and collimated by the curved mirror 108 into a beam 154 and directed back to the pupil 112 of the viewer's eye 115 where it is focused by the viewer's lens 114 onto the viewer's retina 116. The optical filter 156 may be provided to prevent light reflected from the viewer's face and eye from being reflected off the curved mirror 108 and back to the eye 115 of the viewer.

The display 182 differs from the display 148 of FIG. 4 by maintaining the curved mirror 108 substantially stationary. Instead of maintaining the array 150 of light emitters 162 stationary, the array 150 is moved vertically in the z-axis direction, although only three positions of the array 150, 150' and 150" are shown in FIG. 8. Moving the array 150 vertically alters the location and angle at which the beam 154 is directed by the curved mirror 108 onto the pupil 112 of the viewer, analogous to the manner in which rotating or vertically moving the curved mirror 108 in the display 148 alters the location and angle at which the light is directed onto the pupil 112. In some embodiments, the array 150 is moved vertically so the light emitter 162 emitting light is positioned on the focal surface of the curved mirror 108.

In operation, the light emitters 162 may emit light substantially simultaneously or may be sequentially activated at each vertical position of the array 150. The light emitters 162 are activated with an intensity equal to the intensity of a correspondingly positioned location in the image being displayed. If the light emitters 162 are formed by RGB triads, for example, the relative intensity of the RGB emitters are controlled to replicate the color of a correspondingly positioned location in the image being displayed.

In the embodiment described above, the array 150 of light emitters 162 is stationary in the vertical direction as the light emitters 162 may emit light substantially simultaneously or may be sequentially illuminated in the horizontal x-axis direction. After all of the light emitters 162 have been illuminated, the array 150 of light emitters 162 may be moved to the next vertical position along the z-axis direction, and the light emitters 162, again, emit light substantially simultaneously or emit light sequentially. This process of illuminating the light emitters 162 and then moving the array 150 vertically after each scan continues until the array 150 has moved the entire vertical dimension of the curved mirror 108. In an alternative embodiment, the array 150 of light emitters 162 is moved vertically in the z-axis direction from top to bottom as each light emitter 162 is illuminated in sequence. For example, the array 150 is moved from top to bottom, while the first light emitter 162 in the array 150 is continuously illuminated. The array 150 then returns to the top position, and the second light emitter 162 is illuminated, and it remains illuminated, while the array 150 is moved to the bottom of the vertical scan, etc. However, this alternative embodiment is generally less desirable because it requires that the array 150 be physically scanned at a higher rate than the electrical scanning of the light emitters 162 even though physical scanning is generally slower than electrical scanning. Regardless of the particular sequence that the light emitters 162 are illuminated, the array 150 of the light emitters 162 may be moved along a curved path so that the respective light emitter 162 that is emitting light is maintained at a constant distance from the curved mirror 108.

According to one embodiment, the array 150 is scanned vertically at a frame rate, 60 Hz for example, and each light emitter 162 in the array 150 is modulated at a frequency of 36 KHz (60 Hz*600 lines) to provide a display having the quality of an SVGA display. In this embodiment, the array 150 may include 800 respective red, green, and blue light emitters 162 (2400 total light emitters 162). In alternative embodiments, the frequency at which the array is physically scanned may be increased, for example to 600 Hz, and the number of light emitters 162 in the array 150 might be reduced. For the case of a 60 Hz scan, the 2400 light emitters 162 may, for example, be multiplexed in groups of 10, thus requiring only 240 circuits (not shown) driving the light emitters 150. For a 600 Hz scan, the number of light emitters may be reduced. Other combinations may also be used.

As with the stationary array 150 of light emitters 162 of FIG. 4, the moving array 150 of FIG. 8 is not located at the viewer's focus plane (such as at infinity), and the array 150 and electrical conductors (not shown) driving it are not clearly visible to the user. Additionally, by moving the array 150 at a rapid rate, there may be less chance it may be visible to the user, and to the extent the array 150 obscures some of the light returning from the curved mirror 108, this shadowing effect is spread out over the entire viewing area.

Vertically moving the array 150 rather than vertically scanning the curved mirror 108 may further provide a potentially higher scanning frequency. The array 150 may be lighter than the curved mirror 108, and it may have a smaller cross-sectional area to move through the air. As a result, for given power and actuator constraints, it may be possible to vertically scan by moving the array 150 of light emitters 162 at a frequency that is higher than the frequency at which vertical scanning may be accomplished by rotating the curved mirror 108 or vertically moving the curved mirror 108 in the z-axis direction.

FIG. 9A shows a scanned beam display 184 that provides a larger field-of-view for a given curved mirror diameter according to an embodiment. In order to increase the field-of-view, the diameter of the curved mirror 108 may be increased. However, a larger mirror is undesirably bulky, expensive, and heavy. In the scanned beam display 184, a lens 186 is used to increase the field-of-view to the viewer. In one embodiment, the lens 186 is a lens doublet. The scanned beam display 184 is structurally very similar to the scanned beam display 182 of FIG. 8. Therefore, in the interest of brevity, components in both displays 182, 184 that are identical to each other have been provided with the same reference numerals, and an explanation of their structure and function will not be repeated unless the components function differently in the two displays 182, 184. Like the display 182, the display 184 includes a curved mirror 108 aligned with a pupil 112 of the viewer's eye 115. The lens 186 is located between the array 150 and the viewer's pupil 112, and the array 150 is located forward of the focal surface of the curved mirror 108. By positioning the array 150 forward of the focal surface of the curved mirror 108, the point which the array 150 may rotate in order to maintain a constant distance between the light emitters 162 thereon and the curved mirror 108 is moved within the display 184. Thus, instead of the pivot point for the array 150 being located approximately at the eye 115 of the viewer as in the display 182 of FIG. 8, the pivot point is located within the display 184 facilitating the mechanical design of a pivoting mechanism.

In operation, the light emitters 162 of the array 150 emit light that is directed onto the curved mirror 108. However, since the array 150 is located forward of the focal surface of the curved mirror 108, the light reflected from the curved mirror 108 will not be collimated (i.e., slightly divergent). The lens 186 focuses the divergent light reflected from the curved mirror 108 into a substantially collimated beam that is directed onto the pupil 112 of the viewer's eye 115. As shown in FIG. 9A, in one embodiment, the array 150 may be moved vertically in the z-axis direction, while the lens 186 and the curved mirror 108 are maintained stationary in order to vertically scan light in the z-axis direction collimated by the lens 186. In an alternative embodiment, the array 150 may be rotated about an axis that extends through the lens 186 or proximate the lens 186 in the x-axis direction. In this embodiment, the array 150 rotates so that the light emitter 162 of the array 150 emitting light is located on the focal surface of the optical system defined by the curved mirror 108 and the lens 186. By moving the point of rotation to the lens 186 or a location proximate the lens 186, a support bar that supports the array 150 may be shortened which substantially reduces the moment of inertia of the support bar. In an alternative embodiment, the curved mirror 108 and the array 150 are maintained stationary and the lens 186 may be tilted, i.e., rotated about the x-axis, moved vertically in the z-axis direction, or combinations thereof to scan the collimated beam across the viewer's pupil 112 in the vertical z-axis direction. In yet another alternative embodiment, the lens 186 and the array 150 are maintained stationary, while the light focused by the lens 186 may be scanned across the viewer's pupil 112 in the vertical z-axis direction in a manner similar to the display 148 of FIG. 4 by tilting, i.e., rotating the curved mirror 108 about the x-axis, vertically moving the curved mirror 108 in the z-axis direction without rotating the curved mirror 108, or combinations thereof. Although the use of the lens 186 was described using a scanned display structurally similar to the display 182 of FIG. 8, the lens 186 may also be used with displays 100, 148 shown in FIGS. 1 and 4.

FIG. 9B shows a variable power objective element 902 positioned between a large numerical aperture scanned beam image source 901 and the user's eye, here shown in two positions 904 and 906 according to an embodiment. According to one embodiment a manual adjustment control 908 is adjusted by the user to optimize the image according to the user's preference. In position 904 for example, a user may prefer to maximize his or her field-of-view. In position 906 for example, a user may prefer to adjust the control 908 to compress the image to fit within the reduced field-of-view. Optionally, adjustment may be provided to vary the apparent distance of the image to best focus the image for the user's preference.

In an alternative embodiment, an automatic system 910 may be provided to adjust the variable power objective element 902. In one embodiment, a detector 912 may measure a characteristic correlated to the user's eye position. For example, detector 912 may be a range detector that monitors the distance from the display to the user's face. Alternatively, the detector 912 may measure the angle subtended by the eye or the user's face. In a second alternative, an amount of light reflected from the field-of-view may be measured. Other detector technologies may be used as known to those skilled in the art. A microcontroller 914 receives an eye position correlation signal from the detector 912 and enables or actuates the optical variation of the variable power objective element 902.

In another alternative embodiment, which may be used in conjunction with or independent of the variable power objective element 902, the microcontroller 914 may control image source 901. According to one option, the microcontroller 914 enables or controls the image source 901 to display an image when a viewer's eye is in position to see an image and/or enter a reduced power, non-display mode when a viewer's eye is not present. A delay timer may be used to keep the image source 901 enabled in the event a user looks away briefly or to allow time for a new viewer to bring the display to his or her eye (or bring his or her eye to the display). The logic of the microcontroller 914 may also be predictive to enable the image source 901 and/or the variable power objective element 902 when conditions indicate a probability that a user will present to the system.

FIG. 9C shows a simple user-controlled variable power objective according to an embodiment. First fixed-power objective lens 916 is shown positioned in front of the image source 901. The first fixed-power objective lens 916 is held by or formed integrally with adjustment plate 918, along with at least one second fixed-power objective lens 920. The adjustment plate 918 is adapted to rotate around axis 922 so as to bring second fixed-power objective lens 920 to bear on the image source 901 when a user manually enables such a change by moving adjustment tab 924. Detents may be formed to keep a selected objective lens (e.g., 916 or 920) in place when so desired. The optical characteristics of the plural fixed power objective elements 916 and 920 may be selected to meet a range of operating conditions. For example, the first fixed power objective element 916 may be adapted to maximize the display field-of-view when a user places his or her eye close to the system and second fixed power objective element 920 may be adapted to compress the image so as to make substantially the entire image visible to the user when his or her eye is farther away from the system.

In still another alternative embodiment (not shown) the position of the light source, the curved mirror, and the variable power objective element may be moved relative to one another to provide desired sets of optical path lengths between the light source, the curved lens, and the variable power objective element. Helical gears, stepper positioners, sliding stages, piezoelectric actuators, and other mechanisms known to one skilled in the art may be used to provide a controlled series of positions.

Figure 10:
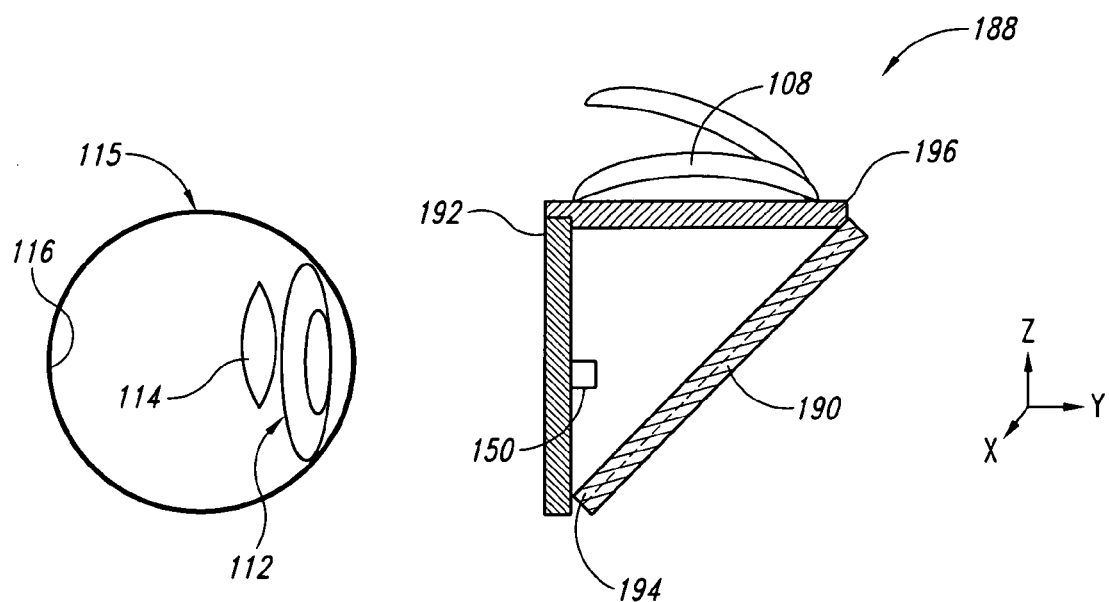
FIG. 10 is a schematic cross-sectional view of a see-through scanned beam display according to an embodiment.

FIG. 10 shows an embodiment directed to a see-through scanned beam display 188. The display 188 differs from the previously described displays by having a partially transparent mirror 190 extending in a plane at an angle in front of the eye 115 of the viewer. The mirror 190 is located and oriented to reflect light emitted from the array 150 upwardly toward the curved mirror 108. The mirror 190 is formed from a partially transparent material so that the viewer is able to see therethrough. The curved mirror 108 is located and oriented relative to the mirror 190 so that light emitted from the array 150 and reflected from the mirror 190 is directed back onto the curved mirror 108. The curved mirror 108 collimates the light received by the mirror 190. The collimated beam is reflected back towards the mirror 190, and subsequently reflected onto the pupil 112 of the viewer's eye 115 where it is focused by the lens 114 onto the viewer's retina 116.

In operation, the curved mirror 108 scans only in the vertical axis to sweep the collimated beam vertically across the viewer's pupil 112. The collimated beam may be scanned across the viewer's pupil 112 in the vertical z-axis direction by tilting, i.e., rotating the curved mirror 108 about the x-axis, as shown in FIG. 10, moving the curved mirror 108 generally in the y-axis direction without rotating the curved mirror 108, or combinations thereof to alter the location on the mirror 190 that the collimated beam is reflected from. In an alternative embodiment, the collimated beam may be swept vertically across the viewer's pupil 112 by maintaining the curved mirror 108 substantially stationary, while the array 150 is moved vertically in the z-axis direction. Simultaneously with production of the image, the real world may be viewed by the viewer looking out through the mirror 190 to form an image on the viewer's retina 116 to the scene beyond. Thus, the display 188 is well-suited to producing an augmented reality experience to the user.

The display 188 is shown with optional filtering plates 192, 194, and 196 to eliminate unwanted image degradation. Filter plates 192 and 194 are polarizers and filter plate 196 is a quarter-wave plate. The filter plate 192 polarizes light entering from the viewing aperture in front of the viewer's eye 115. The filter plate 194 polarizes light entering from the partially transparent mirror 190. The filter plate 196 rotates the polarized light entering through the filter plates 192 and 194 by 45 degrees on its first pass. After the light is reflected off curved mirror 108, the filter plates 196 rotates the axis of polarization another 45 degrees such that it is then rotated 90 degrees from the incoming light. The rotated polarized light is then attenuated by the filter plates 194 and 192 to substantially eliminate unwanted interference with the image and the real world as viewed by the viewer.

The embodiment of FIG. 10, including the filtering functions of the filter plates 192, 194, and 196, may be varied to suit the particular application. For example, according to one embodiment the positions of partially transparent mirror 190 and the filter plate 194 are reversed. This may reduce aberrations caused by the conical and swept beams reflecting off multiple surfaces.

Figure 11:
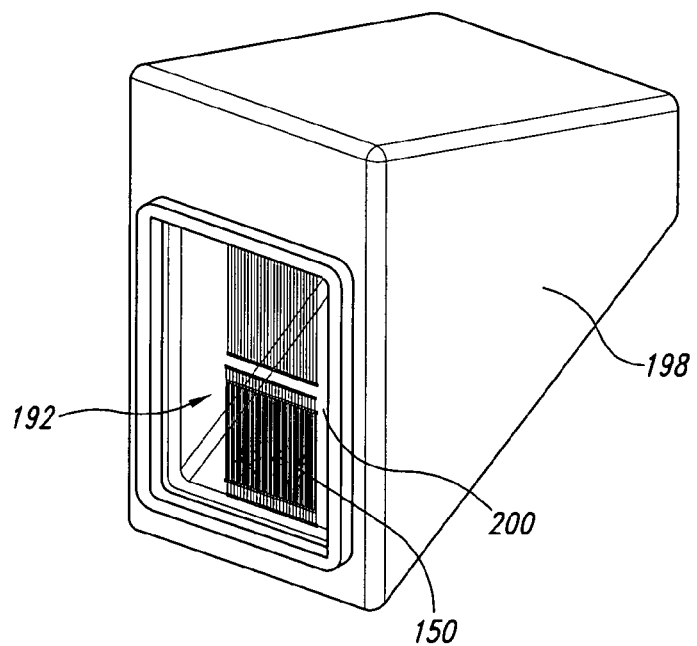
FIG. 11 is a schematic isometric view of the display of FIG. 10 in a package according to an embodiment.
Figure 12:
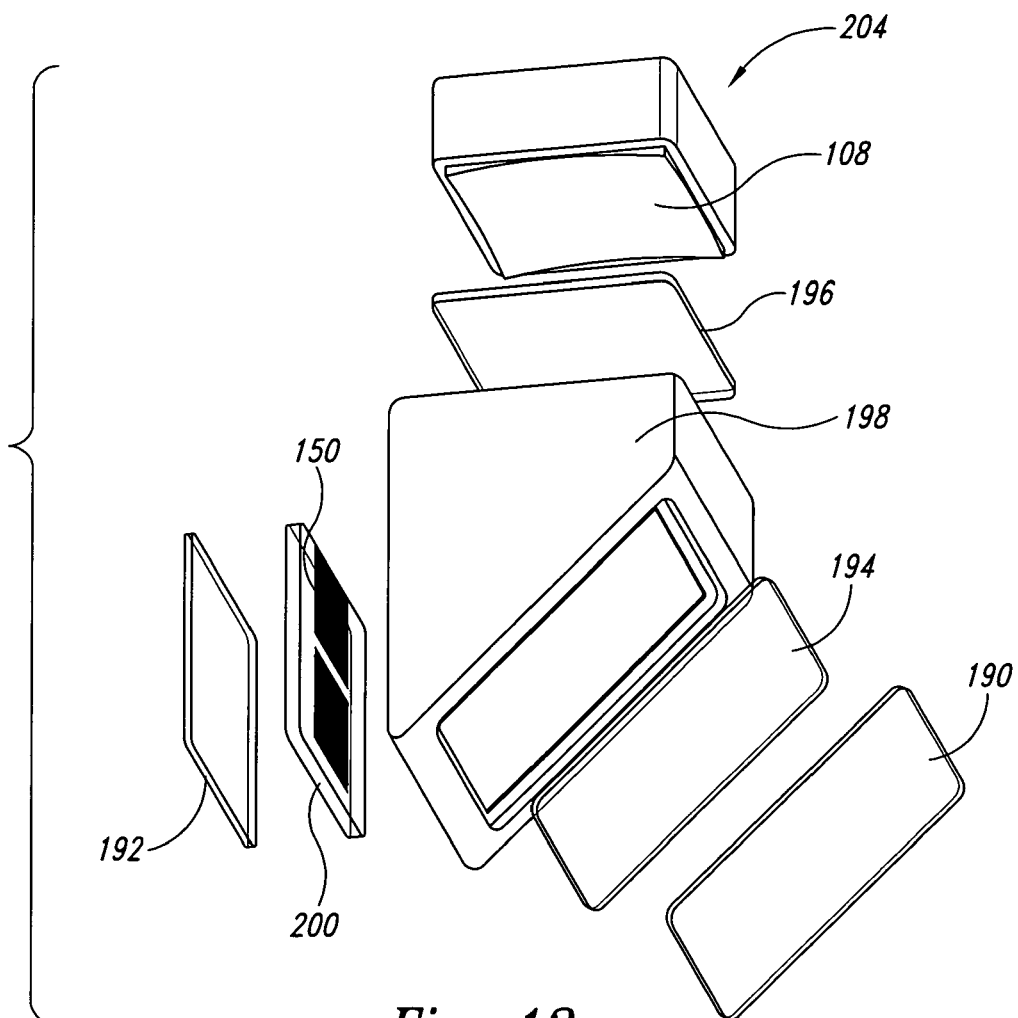
FIG. 12 is an exploded schematic isometric view showing the main components of the embodiment of FIG. 11.

FIGS. 11 and 12 show an embodiment for packaging the display 188 of FIG. 10. A housing 198 is attached to a scanning mirror assembly 204 that carries the curved mirror 108. The housing 198 further holds the partially transparent mirror 190 and the filters 192, 194, and 196. As best shown in FIG. 12, the housing 198 receives the filter plate 196 and connects to the scanning mirror assembly 204 that carries the curved mirror 108. The housing 198 further receives the emitter plate 200 within the interior of the housing 198 and is configured to connect to the filter plate 192. The housing 198 also receives the filter plate 194 and connects to the partially transparent mirror 190.

In the displays shown in FIGS. 4 through 12 which employ the array 150 of light emitters 162, the array 150 is fully populated with the light emitters 162 so that the light reflected from the mirror 108 only needs to be scanned in the vertical axis (i.e., the z-axis direction). However, the array 150 may be sparsely populated with light emitters 162 so that there is not a one-to-one correspondence of the number of the light emitters 162 of the array 150 and the number of pixels of a horizontal pixel line to be generated on the viewer's retina 116. For example, the regions of the array 150 between adjacent light emitters 162 may be occupied by electrical contacts or other structures required for the operation of the light emitters 162. Thus, for manufacturing or other design constraints it may not be desirable to use a fully populated array 150 having the required density so that there is a one-to-one correspondence between the number of light emitters 162 of the array 150 and the number of pixels of a horizontal pixel line to be generated on the viewer's retina 116. If a sparse array 150 is employed, each light emitter 162 may correspond to a pixel zone that includes more than one pixel. Thus, a single light emitter 150 may be used to generate more than one pixel on the viewer's retina.

In operation, each of the light emitters 162 of the array 150 emits light substantially simultaneously or sequentially to generate a pixel in their respective pixel zones. Then, at least one of the array 150, the curved mirror 108, or, if applicable, the lens 186 is moved horizontally in the x-axis direction so that each respective light emitter 162 emits light to generate another pixel in their respective pixel zone, while the others are maintained stationary. In alternative embodiments, the curved mirror 108 is tilted about the z-axis, while the array 150 and, if applicable, the lens 186 are maintained stationary. If a lens 186 is present, as in the embodiment of FIG. 9A, the curved mirror 108 and the array 150 may be maintained stationary, while the lens 186 is tilted about the z-axis. After horizontally scanning the viewer's retina by any of the aforementioned horizontally scanning techniques, additional pixels are generated on the viewer's retina 116 by vertical scanning using any of the aforementioned techniques for effecting vertical scanning. In an alternative embodiment, the vertical scanning may be performed first, followed by horizontal scanning.

Figure 13:
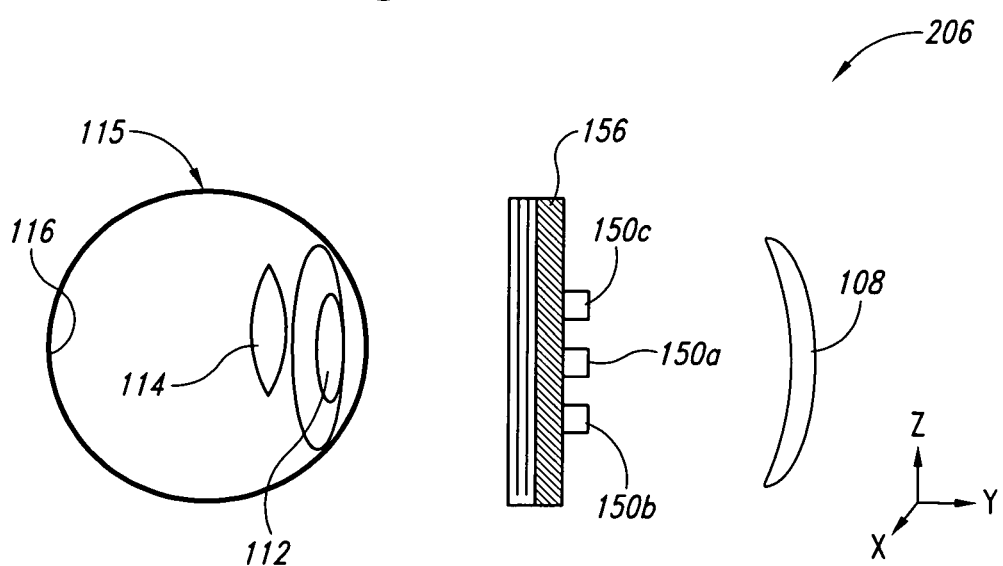
FIG. 13 is a schematic cross-sectional view of a scanned beam display employing three arrays of light emitters according to an embodiment.

FIG. 13 shows a scanned beam display 206 according to an embodiment which eliminates or reduces the required horizontal scanning if the light emitter array 150 is sparsely populated. The display 206 is structurally very similar to the display 148, 182 of FIGS. 4 and 8. Therefore, in the interest of brevity, components in both displays 148, 182, 206 that are identical to each other have been provided with the same reference numerals, and an explanation of their structure and function will not be repeated unless the components function differently in the three displays 148, 182, 206. Instead of having only one array 150 of light emitters 162, the display 206 includes three arrays 150a-150c that may be used to "interpolate" between the adjacent pixels produced by each individual array, thus increasing the proportion of illuminators to column. This may reduce or eliminate the need for scanning in the horizontal axis. Using more than one array 150 may also be used to augment the vertical field-of-view provided by the curved scanner, thus reducing its vertical scan angle for a given vertical field-of-view. Using more than one array 150 may be used to produce a larger field-of-view than a single array, thus enabling a more immersive environment for the viewer. Furthermore, the additional arrays 150 may be used as "hot-swappable" spares in case a corresponding emitter in another array fails. Such swapping may be performed as a whole or individual emitters may be substituted as required. Swapping as a whole generally has an advantage in making it easier to maintain a desired level of pixel registration. The additional arrays 150 may alternatively be used to increase the brightness of the display.

Figure 14:
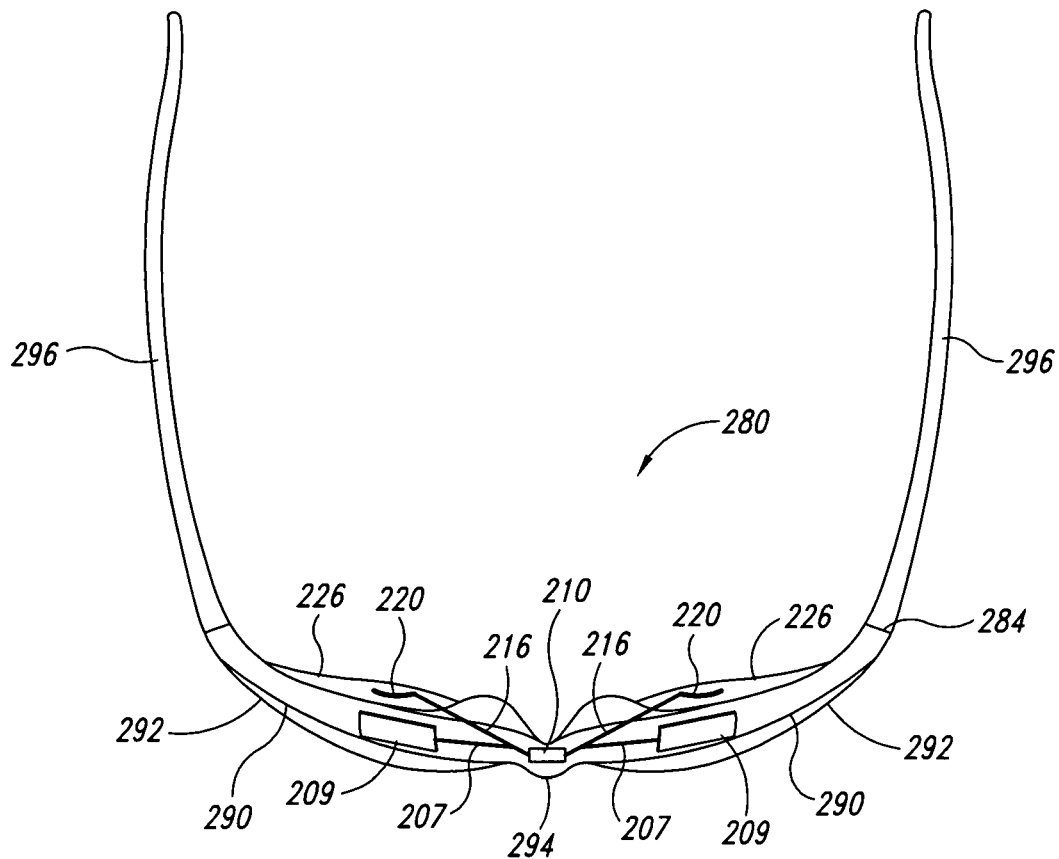
FIG. 14 is a schematic cross-sectional view of a scanned beam display in which the display is mounted in a pair of eyeglasses according to an embodiment.
Figure 15:
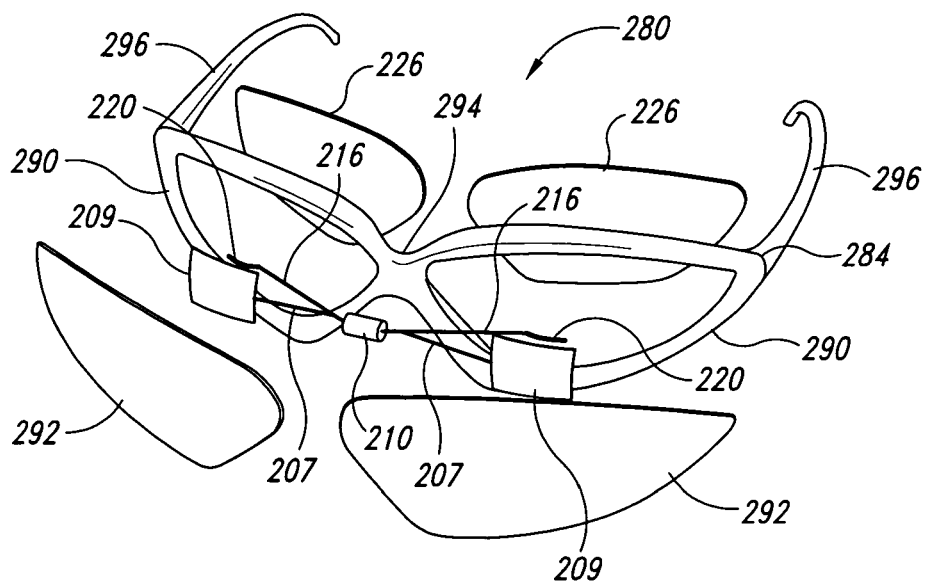
FIG. 15 is an exploded schematic isometric view of the scanned beam display of FIG. 14.

FIGS. 14 and 15 show a scanned beam display 280 according to an embodiment which is in the form of a see-through display physically mounted in a pair of eyeglasses 284. The eyeglasses 284 include a frame having a pair of generally oval lens holders 290 each containing a respective lens 292. The lens holders 290 are connected to each other through a bridge 294. An earbow 296 is attached to an outer portion of each of the lens holders 290, and they extend away from the respective lenses 292. The lenses 292 may be corrective lenses (correcting nearsightedness or farsightedness), sunglass lenses, polarizing lenses or some other type of presently known or hereafter developed lens.

The scanned beam display 280 includes a curved mirror 209 (e.g. a spherical mirror) positioned behind each of the lenses 292. The curved mirrors 209 are secured in position by respective mirror supports 207 that project outwardly from the bridge 294. The curved mirrors 209 are preferably small enough and close enough to the eyes of the viewer that they do not obscure the view through the lenses 292. Also, the curved mirror 209 may be semi-transparent to further reduce the possibility of obscuring the view of a distant object through the lenses 292 since the curved mirror 209 does not obscure the view of the object. In some embodiments, the curved mirror 209 may be a birefringent curved mirror, and the light from the light emitters in the arrays 220 may be cross-polarized to the curved mirror 209. The polarity of the curved mirror 209 may be aligned so that the light is polarized to be parallel to the filter 226. Alternatively, the curved mirror 209 may be designed so that it reflects light in narrow bands corresponding to the wavelengths of light from the light emitters in the arrays 220.

The display 280 also includes an actuator 210, which may be a rotary electromagnetic actuator, attached to the bridge 294. An elongated light support rod 216 extends from each end of the actuator 210, and the rods 216 support respective linear arrays 220 of light emitters at their ends. As best seen in FIG. 20, the arrays 220 are curved to match the curvature of the curved mirrors 209. The actuator 210 may selectively move the arrays 220 vertically, horizontally, or both through the support rods 216. The actuator 210 and light support rods 216 may be configured so that the distance between the curved mirror 200 and the array 220 remains constant as the array 220 is moved up and down. The support rods 216 may carry conductors (not shown) to couple signals to the light emitters in the arrays 220. An optical filter 226 that performs the same function as the optical filter 156 in the display 148 of FIG. 4 is also mounted in each of the lens holders 290. In an alternative embodiment, the light emitters may be mounted proximal to the actuator and their emitted light transmitted to the emission face using light pipes.

The scanned beam display 280 operates in the same manner as described above for the display 148, 182. However, since objects may be viewed through the lenses 292 and filters 226, the display 280 functions as a see-through display in which an image created by the display 280 is superimposed on whatever is viewed through the lenses 292. In an alternative embodiment, the curved mirrors 200 are coupled to the actuator 210 through the supports 207, and the arrays 220 are fixed and supported by the support rods 216. The curved mirrors 200 may be moved vertically, horizontally, or both to effect scanning of light onto the viewer's retina as performed in any of the aforementioned embodiments.

Figure 16:
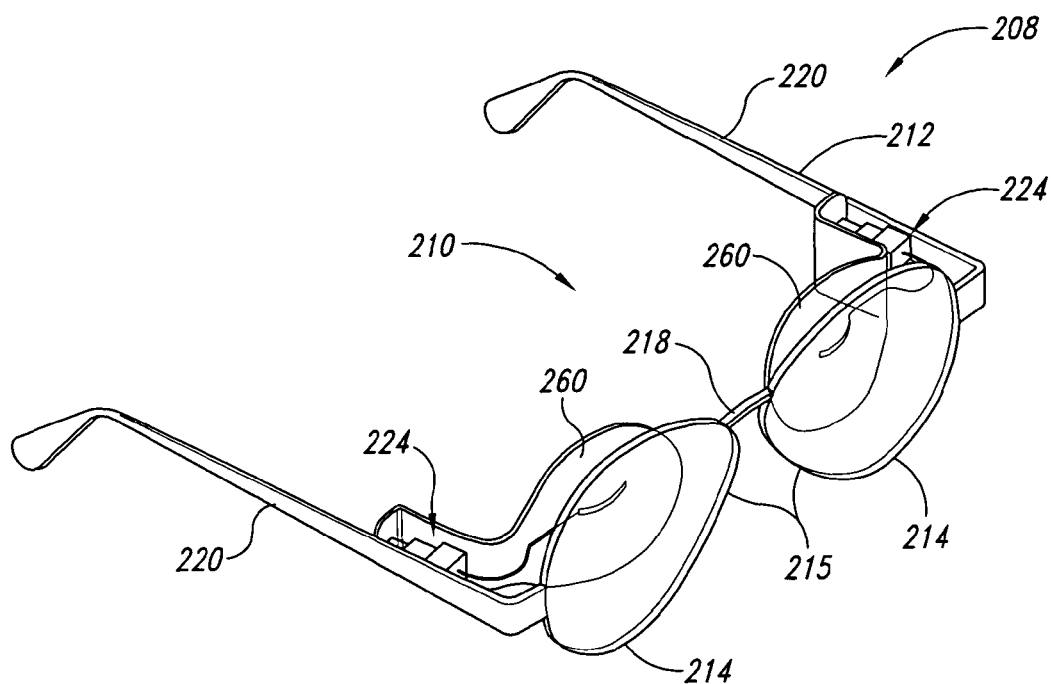
FIG. 16 is a schematic isometric view of a scanned beam display in which the display is mounted in a pair of eyeglasses according to an embodiment.
Figure 17:
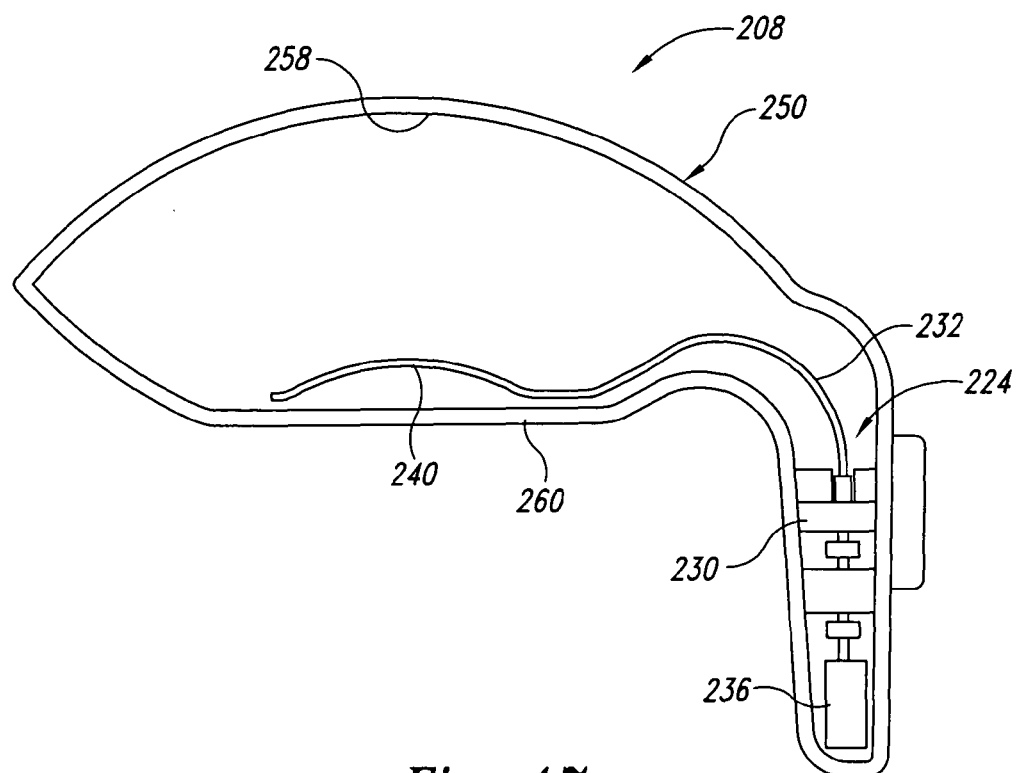
FIG. 17 is a schematic partial cross-sectional view of the scanned beam display of FIG. 16.

FIGS. 16 and 17 show a see-through display 208 according to an embodiment. The display 208 is again integrated into eyeglasses 210 again having a frame 212 including a pair of generally oval lens holders 214 each containing a respective lens 215 and connected to each other through a bridge 218. A respective earbow 220 is again attached to an outer portion of each of the lens holders 214. The display 208 differs from the display 280 of FIGS. 19 and 20 by including a scanning mechanism 224 in each of the earbows 220 rather than in the bridge as in the embodiment of FIGS. 19 and 20. As best shown in FIG. 17, the scanning mechanism 224 includes a pivotally mounted electromagnetic actuator 230 that rotates a support bar 232. The support bar 232 has a generally L-shaped configuration with an optional counter weight 236 attached to one of its ends and a linear array 240 of light emitters 242 or light emission locations attached to its other end. The support bar 232 may be formed from a light weight magnesium alloy. The optional counter weight 236 may reduce vibrations and may house proximally mounted light sources. Vibrations may be further reduced by scanning the left eye and the right eye about 180 degrees out of phase. Thus, the scanning mechanism 224 enables scanning light emitted from the linear array 240 in the vertical z-axis direction by pivotably moving the linear array 840 generally in the vertical z-axis direction.

The array 240 is positioned to illuminate a curved mirror 250 that may be formed by coating the lenses 215 with a reflective coating 258. The reflective coating 258 may, for example, be a narrow-band reflective coating that reflects only light within a range of wavelengths of the light emitted by the light emitters 242 in the array 240. An optical filter 260 is positioned as shown and works like the filter 156 of FIG. 4 to attenuate extraneous light from the face or eye of the viewer that is reflected from the curved mirror 250.

FIG. 18 shows a scanned beam display 600 in the form a head set according to an embodiment. The display 600 functions similarly to the display 182 of FIG. 8 by maintaining a large curved mirror 610 stationary and moving a light emitter array (not shown) enclosed in a housing 608 to scan the collimated light from the curved mirror 610 onto the viewer's retina. The display 600 includes a support structure 602 suitably configured to fit around the top portion of a viewer's head 604. The display 600 further includes a display support 606 that extends from the support structure 602 along the side of the viewer's head 604. The display support 606 includes the housing 608 projecting laterally in front of the viewer's eye. The display support 606 and the housing 608 also includes provision for housing a scanning mechanism that functions like the scanning mechanism 224 of FIG. 17. Thus, the display support 606 and the housing 608 house a scanning mechanism that is configured to move a light emitter array (not shown) which is positioned in front of the viewer's eye vertically within the housing 608. The display 600 further includes a mirror support 614 that has the curved mirror 610 attached thereto. The mirror support 614 positions the curved mirror 610 in front of the housing 608 and the viewer's eye so that light emitted from the light emitter array (not shown) is received by the curved mirror 610 and reflects the received light as a collimated beam. If the curved mirror 610 is partially transparent, the display 600 is configured as a see-through display. The display 600 offers a less bulky and less expensive alternative to the eyeglass mounted displays 280, 208 of FIGS. 14 and 16.

FIGS. 19 and 20 shows a scanned beam display 700 that is attached to a cellular phone 702 according to an embodiment. The display 700 functions similarly to any of the aforementioned displays which use a stationary mirror and a moving light source. The cellular phone may be any type of conventional cellular phone. The phone 702 shown in FIGS. 19 and 20 is a flip phone having a conventional phone display (i.e., for displaying the phone number called, addresses, etc) hingedly attached to flip open and closed. However, other types of cell phones may be used. The phone 702 includes the display 700 integrated into the base of the phone 702. The display 700 includes a curved mirror 706 and a light emitter array 704 that is configured to move in a direction 705. The scanned image generated by the display 700 is viewed by a viewer through a viewing aperture 704. The curved mirror 706 is attached to the base of the phone 700 through a pair of arms 710 that are configured to be extended from a housing 712, as shown in FIG. 19, and retracted within the housing 712 of the phone 702, as shown in FIG. 20. The arms 710 of the display 700 may be manually extended to move the curved mirror 706 away from the base of the phone 702 or an actuator may be employed to extend the arms 710 to move the curved mirror 706 away from the base of the phone 702.

Figure 21:
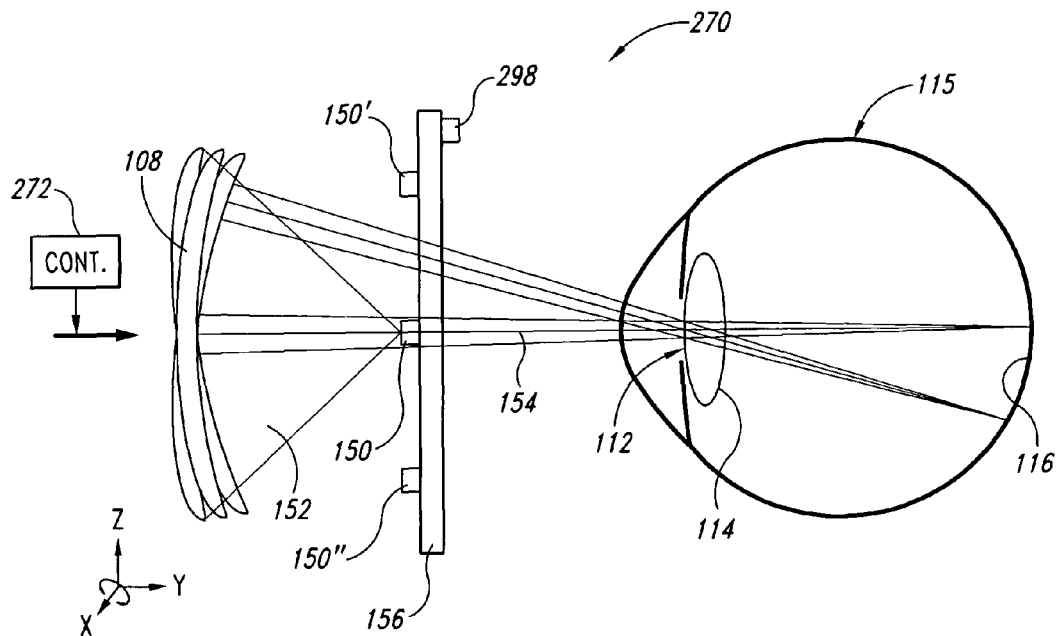
FIG. 21 is a schematic cross-sectional view of a scanned beam display in which the displayed image moves with the movement of a viewer's eye according to an embodiment.

FIG. 21 shows a scanned beam display 270 according to an embodiment. The display 270 has many of the same components that are included in the display 182 of FIG. 8. Therefore, in the interest of brevity, the components of the two displays 182, 270 that correspond to each other have been provided with the same reference numerals, and an explanation of their structure and operation will not be repeated. The scanned beam display 270 differs from the display 182 of FIG. 8 in three respects. First, instead of the curved mirror 108 being stationary, the curved mirror 108 is mounted in an actuating mechanism that is configured to rotate the curved mirror 108 about two orthogonal axes, such as the horizontal x-axis and vertical z-axis. The actuating mechanism may also be configured to move the curved mirror 108 horizontally in the x-axis direction, vertically in the z-axis direction, or both. Second, the display 270 includes a sensor 298 that tracks the movement of the viewer's eye 115. Finally, the display 270 includes a control system 272, which may be microprocessor based. The control system 272 controls the positions of the curved mirror 108 to keep the exit pupil of the display directed so as to stay visible to the viewer. Additionally or alternatively, the control system may control the position of the array 150 and/or the scanning of the light emitters 162 in the array 150 to control the placement of the image presented by the display 270 to the viewer's eye 115. For example, the image may be panned or controlled to remain stationary or display context-sensitive information as the viewer looks in different directions to view objects through the lenses 215.

Figure 22:
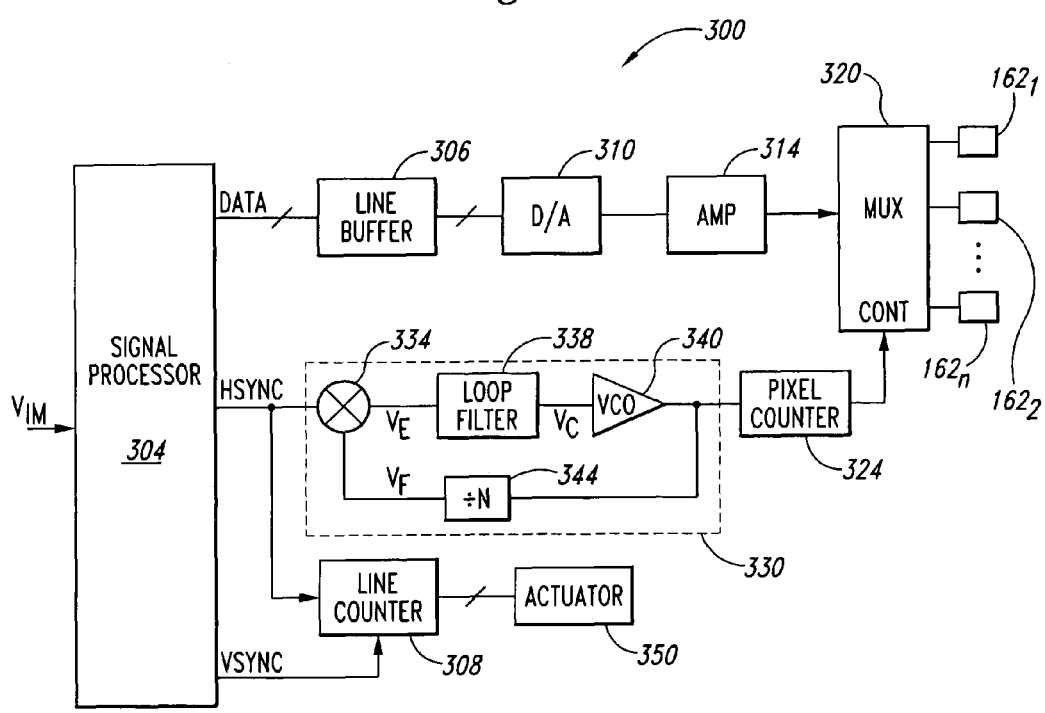
FIG. 22 is a block diagram of a control system that may be used with the displays of FIGS. 1 through 21 according to an embodiment.

FIG. 22 shows a control system 300 that may be used to electrically and physically scan the array 150 according to an embodiment. The control system 300 includes a signal processor 304 that receives a video signal $V_{IM}$ corresponding to an image. The signal processor 304 extracts digital data representing lines of the image. For example, where the video signal $V_{IM}$ is an analog signal, a conventional analog-to-digital converter may provide the digital data. Where the video signal $V_{IM}$ comprises digital data, the digital information may be extracted directly. The digital image data generated by the signal processor 304 is segmented into groups of data, where each group contains data representing a single line of the image. Each group of data corresponding to a line is stored in a line buffer 306.

The signal processor 304 also extracts horizontal and vertical synchronization signals HSYNC, VSYNC, respectively. The horizontal synchronization signal HSYNC is generated after each line of the image, and it is used to increment a line counter 308, which generates a corresponding line address. Thus, the line address from the counter 308 identifies the line of image data stored in the buffer 306. After each horizontal synchronization signal HYSNC, a line of image data is retrieved from the line buffer 306 and provided to a digital-to-analog (D/A) converter 310. (The line buffer 306 operates in synchronism with a clock signal, which has been omitted from FIG. 22 in the interest of clarity). The D/A converter 310 converts the digital data to an analog signal that is amplified at an amplifier 314 and applied to the input of a multiplexer ("MUX") 320. The multiplexer 320 is controlled by a digital control value from a recirculating pixel counter 324. The multiplexer 320 couples the output of the amplifier 314 to one of the outputs as determined by the control value. Each output of the multiplexer 320 is coupled to a respective light emitter $162_1, 162_2 \ldots 162_N$ in the array 150. The pixel counter 324 is incremented by the output of a phase-lock loop ("PLL") 330.

The phase lock loop 330 includes a phase detector 334 that compares the phase of the HSYNC signal to the phase of a feedback signal $V_F$. The phase detector outputs an error signal $V_E$ having a magnitude corresponding to the difference between the phase of the feedback signal $V_F$ and the phase of the HSYNC signal. This error signal $V_E$ is amplified and low-pass filtered by a loop filter 338 to generate a control signal $V_C$ that is used to control the frequency of the signal generated by a voltage controlled oscillator ("VCO") 340. The feedback signal $V_F$ is generated by coupling the output of the VCO 340 through a frequency divider 344. The frequency divider 344 divides the frequency of the signal from the output of the VCO 340 by "N", where N is the number of light emitters 162 in the array. Therefore, the VCO 340 outputs N pulses for each HSYNC pulse. Each of the N pulses increments the pixel counter 324 so that the output of the amplifier 314 is sequentially coupled to each of the light emitters $162_1, 162_2 \ldots 162_N$ in the array 150 after each HSYNC pulse.

The line counter 308 generates a digital value corresponding to the line of analog signals currently being applied to the multiplexer 320. This digital value is applied to an actuator 350, which vertically moves the array 150 to a position corresponding to the value of the digital signal from the line counter 308. The line counter 308 is reset by the vertical synchronization ("VSYNC") pulse, which occurs at the start of each image frame.

Figure 23:
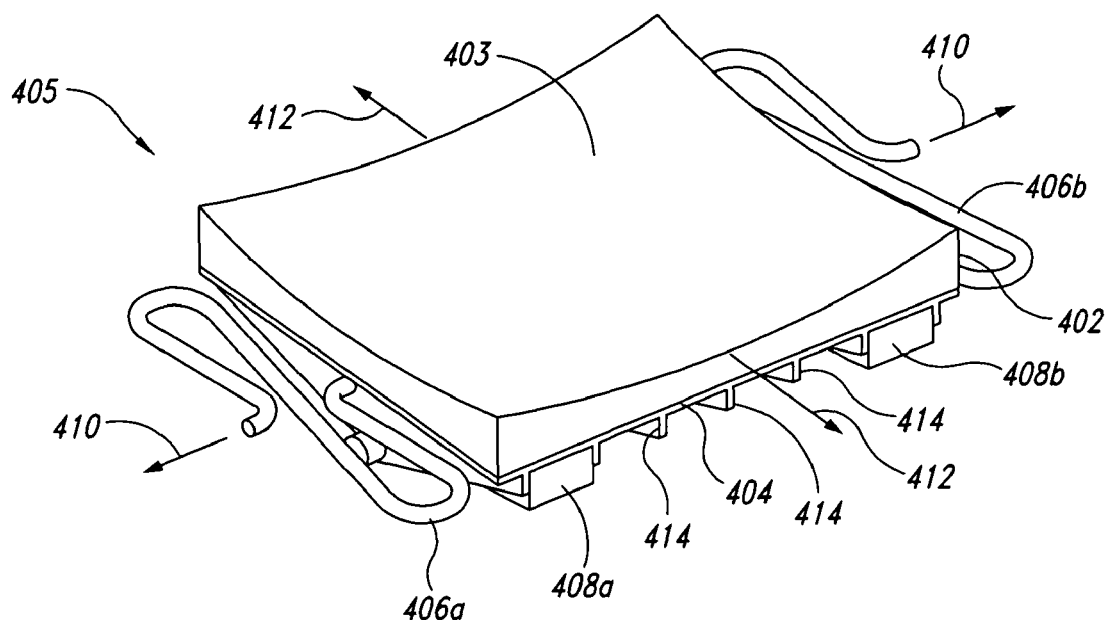
FIG. 23 is a schematic isometric view of a scanning mirror assembly according to an embodiment.

FIG. 23 shows an embodiment of a scanning curved mirror assembly 405 that may be used in many of the aforementioned display embodiments that use a moving mirror. The scanning curved mirror assembly 405 includes a plastic plate 402 having a curved reflective surface 403. In some embodiments, the curved reflective surface 403 may be spherical. A support frame 404 having stiffening ribs 414 supports the plastic plate 402 and helps to maintain its shape, especially under dynamic loading arising from scanning accelerations. The support frame 404 may be affixed to the plastic plate 402 by insert molding, gluing, mechanical fastening, sonic welding, or another suitable technique. Springs 406a and 406b are attached to the support frame 404 and pivotally attached to a housing (not shown). In one embodiment, the plastic plate 402 may be molded to form the curved reflective surface 403 while being supported by the support frame 404. In this embodiment, the lower surface of the plastic plate 402 will be bonded to the support frame 404 due to the temperature and pressure experienced by the plastic plate 402 and the support frame 404 during the molding process. By forming the plastic plate 402 from a low density optical-grade plastic, the inertial loads of the system may be kept desirably low during scanning accelerations while still providing the required optical properties to reflect light. The light weight support frame 404 provides support for the plastic plate 402 so that the plastic plate 402/support frame 404 exhibits a sufficient amount of stiffness to tolerate scanning accelerations, while not undesirably increasing the moment of inertia of the system. In one embodiment, the support frame 404 is formed from cast light weight magnesium alloy to provide the structural support for the plastic plate 402 without undesirably increasing the mass of the system.

The scanning mirror assembly 405 is supported by the springs 406a and 406 which are pivotably attached to a housing (not shown) or other suitable mounting structure so that the scanning mirror assembly 405 may rotate about an axis 410, an axis 412, or both. By matching the mass distribution of the rotating assembly and the spring constant of the springs 406a and 406b, one or more resonant frequencies are selected as is known to the art.

In some embodiments, the rotation of the scanning mirror assembly 405 may be effected by using permanent drive magnets 408a and 408b affixed to the support frame 404. In response to a magnetic field, the scanning mirror assembly 405 rotates about at least one the axes 410 and 412. In one embodiment, the drive magnets 408a and 408b are affixed to the underneath of the support frame 404, however, other configurations may be used for the spacing of the magnets as will be shown in FIG. 24. For example, according to one embodiment, magnets are placed under each corner of the support frame 404. The drive magnets 408a and 408b, and others not shown are aligned with substantially parallel vertical fields.

Figure 24:
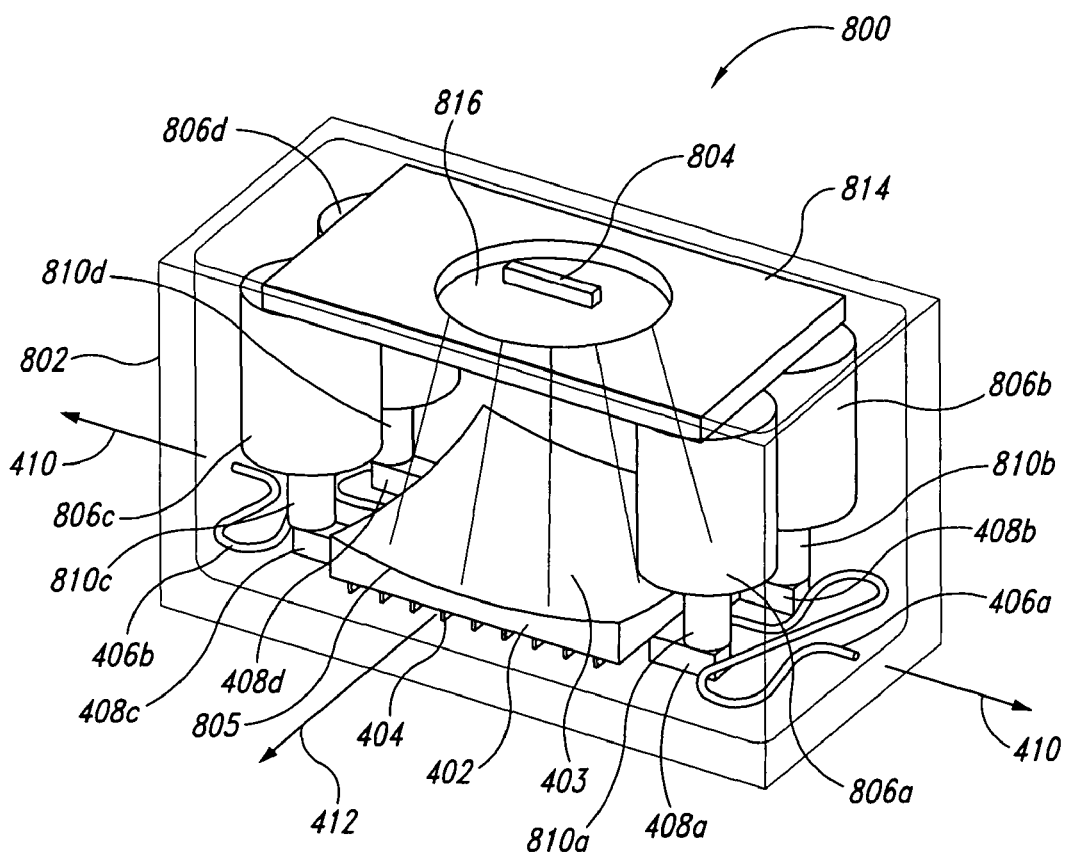
FIG. 24 is a schematic isometric view of a scanned beam display employing a scanning mirror assembly that is actuated using a magnetic actuator system according to an embodiment.

FIG. 24 shows an alternative embodiment of a scanned beam display 800 that utilizes a scanning curved mirror assembly 805 similar to the scanning mirror assembly 405. Therefore, in the interest of brevity, components in both scanning mirror assemblies 405, 805 that are identical to each other have been provided with the same reference numerals, and an explanation of their structure and function will not be repeated unless the components function differently in the two scanning mirror assemblies 405, 805. In the scanning mirror assembly 805, the permanent drive magnets 408a-408d are affixed to the support frame 404 laterally adjacent the corners thereof instead of underneath the support frame 404. The scanned beam display 800 includes a housing 802 that houses the scanning mirror assembly 805 and associated components. The scanned beam display 800 includes four vertical electromagnets 806a-806d corresponding to each of the drive magnets 408a-408d. Permanent magnets 810a-810d are disposed between corresponding drive magnets 408a-408d and electromagnets 806a-806d. The four electromagnets 806a-806d are positioned between a light emitter array 804 and the curved reflective surface 403 to provide an appropriate standoff between the array 804 and the curved reflective surface 403.

In operation, the four electromagnets 806a-806d generate corresponding magnetic fields to selectively rotate the scanning mirror assembly 805 about the axis 410 and 412. Rotation about the axis 410 may be effected by generating a vertical magnetic field from the electromagnets 806a and 806c aligned with the vertical magnetic field of corresponding drive magnets 408a and 408c to provide an attractive force therebetween. Rotation about the axis 410 in the other direction may be effected by generating a vertical magnetic field from the electromagnets 806b and 806d aligned with the vertical magnetic field of corresponding drive magnets 408b and 408d to provide an attractive force therebetween. Similarly, rotation in one direction about the axis 412 may be effected by generating a vertical magnetic field from the electromagnets 806a and 806b aligned with the vertical magnetic field of corresponding drive magnets 408a and 408b to provide an attractive force therebetween. Rotation about the axis 412 in the other direction may be effected by generating a vertical magnetic field from the electromagnets 806c and 806d aligned with the vertical magnetic field of corresponding drive magnets 408c and 408d to provide an attractive force therebetween. The permanent magnets 810a-810d disposed between the drive magnets 408a-408d and the electromagnets 806a-806d are oriented so that the poles of the permanent magnets 810a-810d operate to bias the drive magnets 408a-408d away from the electromagnets 806a-806d upon removal of the vertical magnetic field generated by respective electromagnets 806a-806d. Thus, the permanent magnets 810a-810d help prevent the electromagnets 806a-806d from binding with a corresponding drive magnet 408a-408d as may occur in absence of the permanent magnets 810a-810d.

The display 800 further includes a filter 814 positioned between the array 804 and the electromagnets 806a-806d which functions the same as the filter 156 of FIG. 4. The scanning of light emitted from the array 804 is performed in the same manner as any of the aforementioned scanned beam displays that employ a stationary array of light emitters and a moving mirror. The scanned light is viewed through a viewing aperture 816. Furthermore, although the scanning mirror assemblies 405 and 805 have been described as using a magnetic actuation mechanism, piezoelectric or electrostatic actuation mechanisms may alternatively be used.

Figure 25:
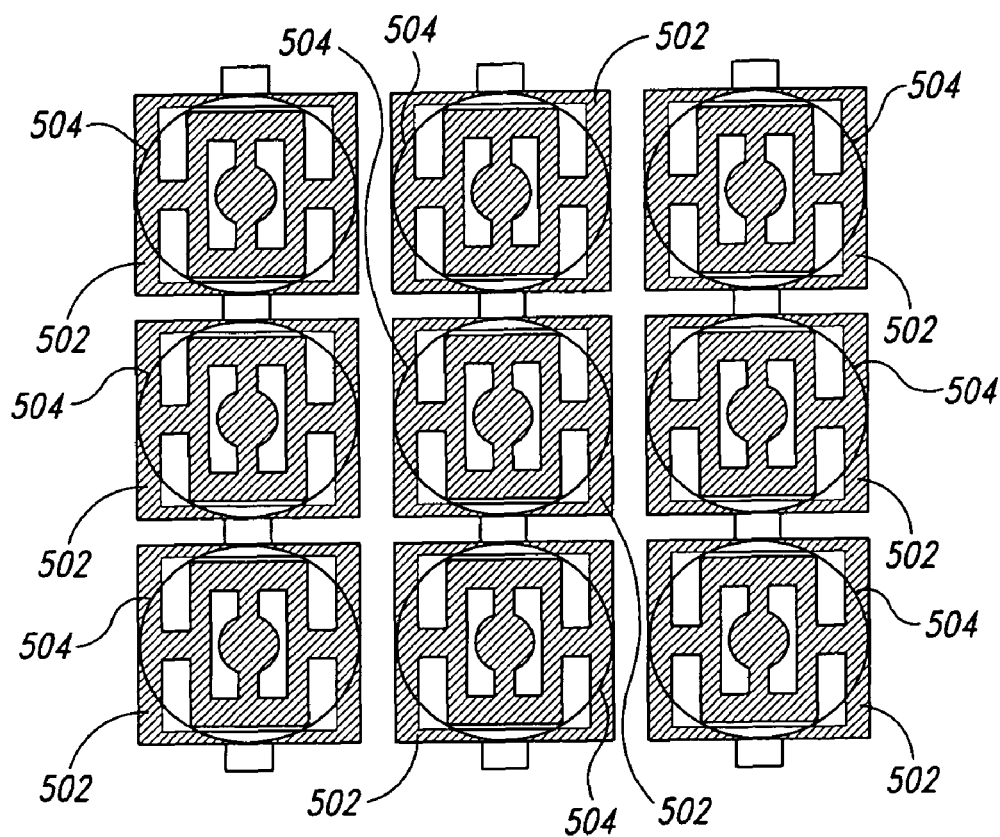
FIG. 25 is a schematic plan view of an assembly of a plurality of interconnected scan frames with individual mirrors bonded thereto.
Figure 26:
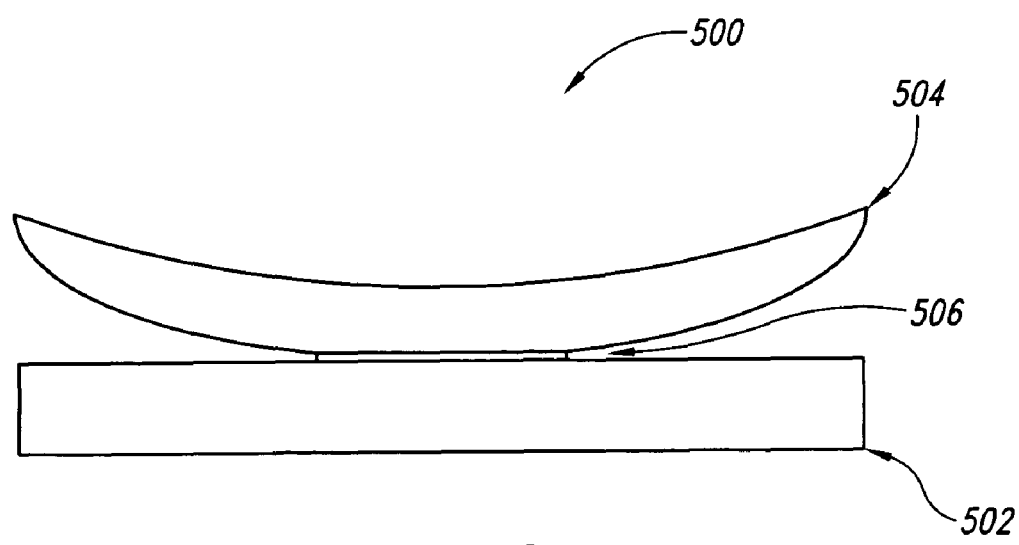
FIG. 26 is a schematic sectional view of an individual scanning mirror assembly diced from the assembly of FIG. 25.

FIG. 25 is a schematic showing an embodiment of a method for fabricating a scanning curved mirror assembly 500 suitable for use in many of the displays of the aforementioned embodiments that use a moving mirror. The scanning curved mirror assembly 500 may be fabricated using two wafers, a first wafer (e.g., a silicon wafer) formed to have a suitable geometry for a bi-axial scan frame and another from an optical-grade plastic wafer. The plastic wafers are molded to form a plurality of plastic mirrors 504, and are then bonded to respective interconnected scan frames 502 with an adhesive 506 using a bonding technique such as an epoxy screen printing process. For example, the epoxy may be screened onto selective locations of the scanner frame 502 and each of the plurality of the plastic mirrors 504 placed on the locations with epoxy to bond the scan frame 502 to a respective plastic mirror 504. The spacing of the plastic mirrors 504 within their scan frame 502 matches the pitch of the scan frame 502. Once bonded together, the plastic mirrors 504 and the scan frames 502 are diced into individual assemblies, as shown in FIG. 26.

The plastic mirror 504 has a curved surface with adequate optical finish and may also help in achieving the Theta-D (maximum scan angle multiplied by mirror diameter) requirements. It should be noted that the flatness considerations may be considered for the portion of the mirror which is projecting the portion of the beam actually entering the pupil. Achieving the required flatness across any one 2 mm diameter within the surface of the mirror may be easier than achieving that flatness across the entire mirror at any one time. The surface curvature over larger distances is made consistent enough to avoid distortion of pixel positions relative to one another. Optical grade plastic is typically much lower density than silicon (creating lower inertial loads) and may be molded with tapered thicknesses to be optimized for structural integrity. Silicon processes are much more limiting and often do not result in optimal structural cross-sections. A third point to note is that a spherical structure is typically more sound than a flat structure. These factors contribute to two dimensional scanners with very high Theta-D's.

Figure 27:
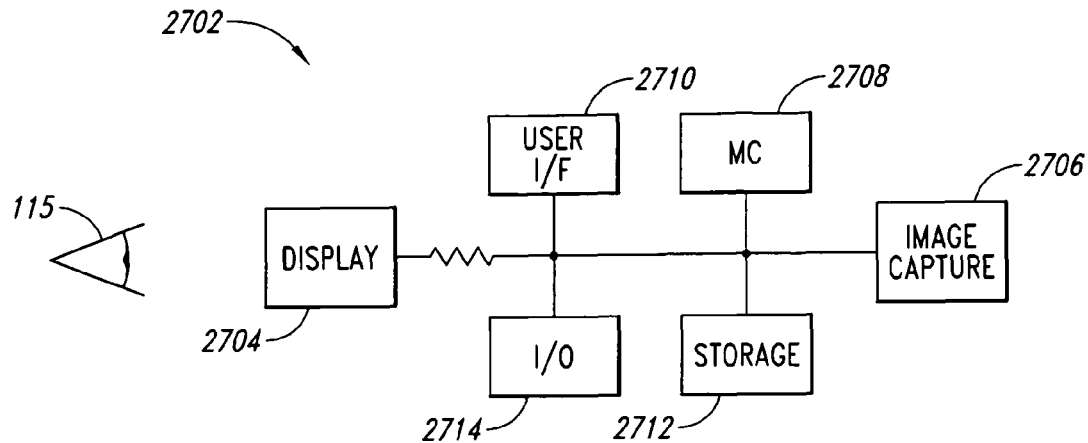
FIG. 27 is a block diagram of a scanned light display system used in conjunction with, or as a subsystem of a still or video camera or other stored image viewing system according to an embodiment.

FIG. 27 shows a block diagram of a system 2702, such as a camera, that uses a scanned beam display 2704 to provide images to the eye of a viewer 115 according to an embodiment. An optional digital image capture subsystem 2706 is controlled by a microcontroller 2708 to continuously or selectively capture still or video images according to user control received via user interface 2710. According to the wishes of the user, images or video may be stored in local storage 2712 and/or alternatively may be sent to an external system through input/output interface 2714. The system 2702 may be controlled to display a live image that is received by the image capture system 2706 or alternatively may be controlled to display stored images or video retrieved from the storage 2712.

Figure 28:
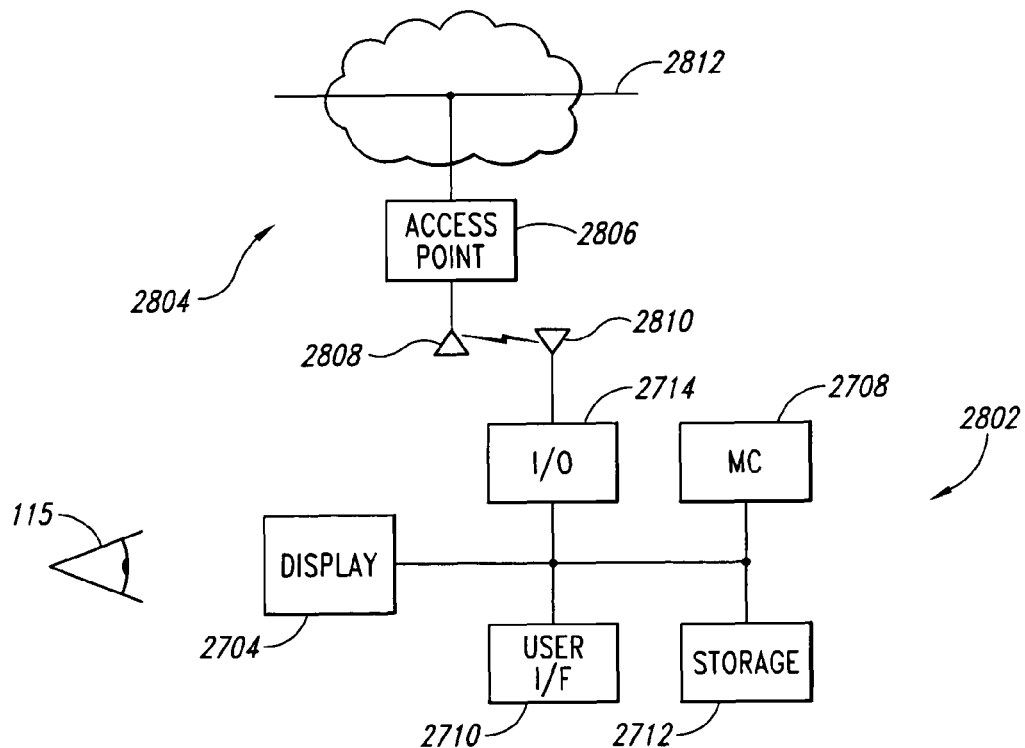
FIG. 28 is a block diagram of a media viewer capable of rendering still and/or video images to a user from a streaming and/or wireless media source according to an embodiment.

FIG. 28 shows a block diagram of a media viewing system 2802 that uses a scanned beam display 2704 to provide images to the eye of a viewer 115 according to an embodiment. The media viewing system 2802 receives images from media delivery infrastructure 2804, which may for example include video or still image delivery services over the Internet, a cellular telephone network, a satellite system, terrestrial broadcast or cable television, a plug-in card, a CD or DVD, or other media sources known to the art. In the example of FIG. 28, an access point 2806 provides a signal via wireless interface 2808 to an input/output of the media viewer 2802 via a wireless interface 2810 interfaced to the remainder of the media viewer 2802 via communication interface 2714. As used herein, the term communication interface may be used to collectively refer to the wireless interface 2810 (e.g., an antenna as shown) and the radio and/or other interface to which it is connected. Media may be delivered across the communication interface in real time for viewing on the display 2704, or may alternatively be buffered by the microcontroller 2708 in local storage 2712. User controls comprising a user interface 2710 may be used to control the receipt and viewing of media. The media viewing system 2802 may for example be configured as a pocket media viewer, a cellular telephone, a portable Internet access device, or other wired or wireless device.

Although the embodiments have been described as using a curved mirror, according to an alternative embodiment, a diffractive optical element may be substituted for the curved mirror described herein. It will be understood that, as modifications to the mirror shape such as adaptation to a Fresnel type mirror remain within the scope, so too does the adaptation to a diffractive element of arbitrary shape. In the interest of brevity and clarity, the term "curved mirror" will be understood to include such alternative mirror types.

Although the invention has been described with reference to the disclosed embodiments, persons skilled in the art will recognize that changes may be made in form and detail without departing from the spirit and scope of the invention. For example, although scanning of the various embodiments have been described with reference to "vertical" and "horizontal" directions, it will be understood that scanning along other orthogonal and non-orthogonal axes may be used instead. Furthermore, although the scanned beam displays have been described for use as retinal scanners, the scanned beam displays may also be used to form images on other types of image surfaces such as a display screen or another type of image surface. Such modifications are well within the skill of those ordinarily skilled in the art. Accordingly, the invention is not limited except as by the appended claims.

We claim:

1. A scanned light display system, comprising:
   a light source operable to emit diverging light;
   a curved mirror positioned to receive at least a portion of the light and configured to substantially collimate the received light; and
   an actuator coupled to at least one of the light source and the curved mirror, the actuator being operable to move the light source and the curved mirror relative to each other in order to scan the substantially collimated light to form an image.

2. The scanned light display system of claim 1 wherein a general direction of the light emitted from the light source is not aligned with a principal axis of the curved mirror.

3. The scanned light display system of claim 1 wherein the light source is positioned in front of the curved mirror.

4. The scanned light display system of claim 1 wherein the actuator is operable to move the light source and the curved mirror relative to each other in order to scan the substantially collimated light in one dimension to form the image.

5. The scanned light display system of claim 1 wherein the actuator is operable to move the light source and the curved mirror relative to each other in order to scan the substantially collimated light in two dimensions to form the image.

6. The scanned light display system of claim 1 wherein the actuator is operable to rotate the curved mirror about at least one axis.

7. The scanned light display system of claim 1 wherein the actuator is operable to move at least one of the light source and the curved mirror in at least one of a horizontal direction and a vertical direction.

8. The scanned light display system of claim 1 wherein the light source comprises at least one array of light emitters positioned in front of the curved mirror, the at least one array having a longitudinal axis extending in a first direction.

9. The scanned light display system of claim 8 wherein the at least one array is stationary and wherein the actuator is operable to rotate the curved mirror about an axis that is substantially parallel to the first direction.

10. The scanned light display system of claim 8 wherein the at least one array is stationary and wherein the actuator is operable to move the curved mirror in a direction that is substantially perpendicular to the first direction.

11. The scanned light display system of claim 8 wherein the curved mirror is stationary and wherein the actuator is operable to move the at least one array in a direction that is substantially perpendicular to the first direction.

12. The scanned light display system of claim 11 wherein the actuator is operable to move the at least one array of light emitters in a manner that maintains the distance between the light emitters and the curved mirror substantially constant as the actuator moves the light emitters.

13. The scanned light display system of claim 8 wherein the curved mirror is stationary and wherein the actuator is operable to move the at least one array in a direction that is substantially parallel to the first direction.

14. The scanned light display system of claim 13 wherein the actuator is operable to move the at least one array of light emitters in a manner that maintains the distance between the light emitters and the curved mirror substantially constant as the actuator moves the light emitters.

15. The scanned light display system of claim 8 wherein the at least one array is stationary and wherein the actuator is operable to move the curved mirror in a direction that is substantially parallel to the first direction.

16. The scanned light display system of claim 8 wherein the at least one array is stationary and wherein the actuator is operable to rotate the curved mirror about an axis substantially perpendicular to the first direction.

17. The scanned light display system of claim 8, further comprising a control system coupled to the light emitters and the actuator, the control system being operable to couple signals to the light emitters in the at least one array to sequentially scan in the first direction and to couple a signal to the actuator to move the at least one array of light emitters and the curved mirror relative to each other.

18. The scanned light display system of claim 17 wherein the control system is operable to couple signals to the light emitters to sequentially actuate each of the light emitters at each position of the at least one array of light emitters when the at least one array of light emitters is moved in a second direction that is substantially perpendicular to the first direction.

19. The scanned light display system of claim 8, further comprising a control system coupled to the light emitters and the actuator, the control system being operable to couple signals to the light emitters in the at least one array to substantially simultaneously emit light from each of the light emitters and to couple a signal to the actuator to move the at least one array of light emitters and the curved mirror relative to each other.

20. The scanned light display system of claim 8 wherein the curved mirror and the at least one array of light emitters are positioned in front of an eye of a viewer, and wherein the system further comprises:
a sensor operable to sense the position of the viewer's eye; and
an image modifying system coupled to a control system, the image modifying system causing the control system to alter the scanning of the light emitters and the position of the at least one array of light emitters so that the position of an image displayed by the scanned light display system can be viewed as the position of the viewer's eye changes.

21. The scanned light display system of claim 8 wherein the curved mirror and the at least one array of light emitters are positioned in front of an eye of a viewer, and wherein the system further comprises:
a sensor operable to sense the position of the viewer's eye; and
a mirror actuator coupled to the sensor, the mirror actuator operable to alter the position of the curved mirror so that the exit pupil of an image displayed by the scanned light display system can be viewed as the position of the viewer's eye changes.

22. The scanned light display system of claim 8 wherein the at least one array of light emitters extends in the first direction with a curvature that corresponds to the curvature of the curved mirror in the first direction.

23. The scanned light display system of claim 22 wherein the curved mirror has a focal surface, and wherein the at least one array of light emitters are positioned substantially at the focal surface.

24. The scanned light display system of claim 23 wherein the curved mirror is a spherical mirror and the focal surface is a focal sphere.

25. The scanned light display system of claim 8 wherein the curved mirror and the at least one array of light emitters are positioned in front of an eye of a viewer, and wherein the scanned light display system further comprises an optical filter positioned between the at least one array of light emitters and the eye of the viewer, the optical filter being operative to substantially attenuate extraneous light reflected from the curved mirror toward the eye of the viewer.

26. The scanned light display system of claim 8 wherein the light emitters comprise:
a plurality of light sources; and
a plurality of light pipes each extending from a respective one of the light sources to a respective location in the at least one array.

27. The scanned light display system of claim 8 wherein the at least one array of light emitters comprises a substantially linear array of light emitters.

28. The scanned light display system of claim 1 wherein the light source comprises a plurality of light emitters, the number of the light emitters being less than the number of pixels of a pixel line of the image.

29. The scanned light display system of claim 1 wherein the curved mirror comprises a stationary curved mirror.

30. The scanned light display system of claim 1 wherein the curved mirror comprises a mirror that is at least partially transparent.

31. The scanned light display system of claim 1 wherein the light source includes an array of light sources and wherein the curved mirror comprises a narrow-band mirror that preferentially reflects light within a range of at least one wavelength of the light emitted by the light sources in the array.

32. The scanned light display system of claim 1 wherein the curved mirror comprises a spherical mirror.

33. The scanned light display system of claim 1 wherein the curved mirror comprises a Fresnel mirror.

34. The scanned light display system of claim 1 wherein the curved mirror comprises a diffractive mirror.

35. The scanned light display system of claim 1 wherein the curved mirror and the light emitters are positioned in front of an eye of the viewer at a distance closer than a viewer's eye is able to focus.

36. The scanned light display system of claim 1, further comprising a partially transparent mirror located and oriented to redirect light emitted from the light source upwardly to the curved mirror.

37. The scanned light display system of claim 1, further comprising a mirror located and positioned to receive light emitted from the light source and redirect the light to the curved mirror.

38. The scanned light display system of claim 37 wherein the optical path of the light is folded.

39. The scanned light display system of claim 1, further comprising a reflective surface positioned to receive scanned light from the curved mirror and redirect the scanned light through a viewing aperture.

40. The scanned light display system of claim 39 wherein the curved mirror is located at a first focal point of an ellipse and a pupil of a viewer's eye can be positioned at a second focal point of the ellipse to receive scanned light from the reflective surface.

41. The scanned light display system of claim 1 wherein the actuator comprises a magnetic actuator, the magnetic actuator including a plurality of electromagnets and wherein the curved mirror is coupled to a plurality of permanent magnets, each of the permanent magnets associated with a corresponding one of the plurality of electromagnets, the curved mirror operable to rotate about at least one axis in response to magnetic fields generated by the plurality of electromagnets.

42. The scanned light display system of claim 41, further comprising a bias magnet disposed between each of the electromagnets and a corresponding one of the permanent magnets, poles of the bias magnet oriented opposite poles of the corresponding permanent magnet.

43. A method of forming an image by scanning light onto a retina of a viewer's eye, the method comprising:
emitting light from a light source;
reflecting the light from a curved reflecting surface;
substantially collimating the reflected light;
scanning the substantially collimated light onto the retina of the viewer's eye to form the image;
sensing the position of the viewer's eye; and
altering the intensity of the light and the positions from which the light are generated so that the position of the image can be viewed as the position of the viewer's eye changes.

44. A method of forming an image by scanning light onto a retina of a viewer's eye, the method comprising:
emitting light from a light source;
reflecting the light from a curved reflecting surface;
substantially collimating the reflected light;
scanning the substantially collimated light onto the retina of the viewer's eye to form the image;
sensing the position of the viewer's eye; and
altering the position of the curved reflecting surface so that the position of the image can be viewed as the position of the viewer's eye changes.

45. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the light source comprises a plurality of light emitters and wherein the plurality of light emitters defines a curve which corresponds to a curvature of the curved reflecting surface.

46. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the act of scanning the substantially collimated light onto the retina of the viewer's eye to form the image comprises moving the light source and the curved reflecting surface relative to each other.

47. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the act of emitting light from a light source comprises emitting light from a plurality of locations generally extending in a first direction and wherein the act of scanning the substantially collimated light onto the retina of the viewer's eye to form the image comprises rotating the curved reflecting surface about an axis that is substantially parallel to the first direction.

48. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the act of emitting light from a light source comprises emitting light from a plurality of locations generally extending in a first direction and wherein the act of scanning the substantially collimated light onto the retina of the viewer's eye to form the image comprises moving the curved reflecting surface in a direction that is substantially perpendicular to the first direction.

49. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the act of emitting light from a light source comprises emitting light from a plurality of locations generally extending in a first direction and wherein the act of scanning the substantially collimated light onto the retina of the viewer's eye to form the image comprises moving the light source in a direction that is substantially perpendicular to the first direction.

50. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the act of emitting light from a light source comprises emitting light from a plurality of locations generally extending in a first direction and wherein the act of scanning the substantially collimated light onto the retina of the viewer's eye to form the image comprises moving the curved reflecting surface in a direction that is substantially parallel to the first direction.

51. A method of forming an image by scanning light onto a retina of a viewer's eye, the method comprising:
emitting light from a light source;
reflecting the light from a curved reflecting surface;
substantially collimating the reflected light; and
scanning the substantially collimated light onto the retina of the viewer's eye to form the image, wherein the act of emitting light from a light source comprises emitting light from a plurality of locations generally extending in a first direction and wherein the act of scanning the substantially collimated light onto the retina of the viewer's eye to form the image comprises moving the light source in a direction that is substantially parallel to the first direction.

* * * * *